United States Patent
Kanellos et al.

(10) Patent No.: US 10,762,464 B2
(45) Date of Patent: Sep. 1, 2020

(54) SYSTEMS AND METHODS FOR DELIVERY OF ONLINE ORDERS

(71) Applicant: Myrmex, Inc., Palo Alto, CA (US)

(72) Inventors: Ioannis Kanellos, Pireaus (GR); Eugenios Fainekos, Athens (GR); Orestis Fainekos, Athens (GR)

(73) Assignee: Myrmex, Inc., Palo Alto, CA (US)

( * ) Notice: Subject to any disclaimer, the term of this patent is extended or adjusted under 35 U.S.C. 154(b) by 659 days.

(21) Appl. No.: 15/593,139

(22) Filed: May 11, 2017

(65) Prior Publication Data

US 2017/0330142 A1    Nov. 16, 2017

Related U.S. Application Data

(60) Provisional application No. 62/335,450, filed on May 12, 2016.

(51) Int. Cl.
   *G06Q 10/08* (2012.01)
   *G06K 7/10* (2006.01)
   *G06K 7/14* (2006.01)

(52) U.S. Cl.
   CPC ..... *G06Q 10/0832* (2013.01); *G06K 7/10297* (2013.01); *G06K 7/1417* (2013.01)

(58) Field of Classification Search
   CPC ........... G06Q 10/0832; G06K 7/10297; G06K 7/1417
   See application file for complete search history.

(56) References Cited

U.S. PATENT DOCUMENTS

| | | | | |
|---|---|---|---|---|
| 4,692,876 A | * | 9/1987 | Tenma | B65G 1/1371 414/791.6 |
| 5,126,732 A | * | 6/1992 | Mardon | G07F 17/12 340/5.33 |
| 5,774,053 A | * | 6/1998 | Porter | A47G 29/141 232/19 |
| 5,946,660 A | * | 8/1999 | McCarty | E05G 1/08 705/5 |

(Continued)

FOREIGN PATENT DOCUMENTS

| | | |
|---|---|---|
| WO | WO 2017/197285 A1 | 11/2017 |
| WO | WO-2019014030 A1 * | 1/2019 ........... B62D 33/042 |

OTHER PUBLICATIONS

Murphy, "Grounding the virtual: The material effects of electronic grocery shopping", published by Elsevier in 2007 (Year: 2007).*

(Continued)

*Primary Examiner* — Kevin H Flynn
*Assistant Examiner* — Omar Zeroual
(74) *Attorney, Agent, or Firm* — Shami Messinger PLLC

(57) ABSTRACT

A method for delivering online orders to customers via a fully unmanned system includes replenishing the pod by using inventory carriers carrying containers via a replenishment hatch, moving an inventory carrier attached to carrier base with a mobile robotic unit in a room of adequate temperature. Additionally, the method includes transferring an inventory carrier at a mini load station and loading the order containers on a delivery carrier. The method further includes transferring a delivery carrier and attaching it to a delivery hatch so that the customer, following authentication, is able to pull the drawers and pick the ordered items.

17 Claims, 24 Drawing Sheets

(56) References Cited

U.S. PATENT DOCUMENTS

| | | | | |
|---|---|---|---|---|
| 6,148,291 | A * | 11/2000 | Radican | G06Q 10/08 705/22 |
| 6,961,711 | B1 * | 11/2005 | Chee | G06Q 10/083 232/27 |
| 7,532,947 | B2 * | 5/2009 | Waddington | G06Q 10/06 700/216 |
| 7,693,745 | B1 * | 4/2010 | Pomerantz | G06Q 10/08 705/26.5 |
| 7,751,928 | B1 * | 7/2010 | Antony | G06Q 10/087 700/214 |
| 7,774,243 | B1 * | 8/2010 | Antony | G06Q 10/0875 414/243 |
| 8,086,345 | B2 * | 12/2011 | Pandit | G06Q 10/08 414/788 |
| 8,280,547 | B2 * | 10/2012 | D'Andrea | B66F 9/063 700/214 |
| 8,311,902 | B2 * | 11/2012 | Mountz | G06Q 10/0833 705/28 |
| 8,892,240 | B1 * | 11/2014 | Vliet | G05D 1/0212 700/216 |
| 8,952,284 | B1 * | 2/2015 | Wong | B07C 5/3412 209/586 |
| 9,009,072 | B2 * | 4/2015 | Mountz | G06Q 10/08 705/28 |
| 9,014,844 | B2 * | 4/2015 | Casey | B65G 57/302 700/217 |
| 9,120,624 | B1 * | 9/2015 | Cassady | B65G 1/137 |
| 9,223,315 | B2 * | 12/2015 | Irwin | G07F 17/12 |
| 9,315,323 | B2 * | 4/2016 | Schubilske | G05B 15/02 |
| 9,409,711 | B1 * | 8/2016 | Hanssen | B65G 1/1378 |
| 9,600,798 | B2 * | 3/2017 | Battles | B65G 1/1373 |
| 9,688,472 | B1 * | 6/2017 | Stubbs | B25J 9/0096 |
| 9,809,384 | B2 * | 11/2017 | Mountz | B65G 1/1378 |
| 9,943,963 | B2 * | 4/2018 | Wise | B25J 9/1674 |
| 10,319,173 | B2 * | 6/2019 | Adelberg | G06Q 10/087 |
| 10,450,138 | B1 * | 10/2019 | Pikler | B65G 1/0492 |
| 2001/0042024 | A1 * | 11/2001 | Rogers | G06Q 10/08 705/26.81 |
| 2002/0026380 | A1 * | 2/2002 | Su | G06Q 30/06 705/26.8 |
| 2002/0130065 | A1 * | 9/2002 | Bloom | B07C 3/02 209/630 |
| 2002/0177922 | A1 * | 11/2002 | Bloom | G07C 9/27 700/213 |
| 2002/0178074 | A1 * | 11/2002 | Bloom | G06Q 10/08 705/26.81 |
| 2003/0110104 | A1 * | 6/2003 | King | G06Q 10/087 705/28 |
| 2003/0149585 | A1 * | 8/2003 | Foster | G06Q 30/0635 705/26.1 |
| 2004/0010337 | A1 * | 1/2004 | Mountz | G05D 1/0297 700/214 |
| 2004/0024730 | A1 * | 2/2004 | Brown | G06Q 10/087 |
| 2004/0039661 | A1 * | 2/2004 | Fuzell-Casey | G06Q 30/0601 705/26.81 |
| 2006/0210382 | A1 * | 9/2006 | Mountz | B65G 1/137 414/498 |
| 2006/0212164 | A1 * | 9/2006 | Abraham, Jr. | G06K 17/00 700/215 |
| 2007/0021863 | A1 * | 1/2007 | Mountz | G06Q 10/087 700/214 |
| 2007/0071585 | A1 * | 3/2007 | Henkel | B65G 1/0407 414/471 |
| 2007/0106413 | A1 * | 5/2007 | Russell | G06Q 10/08 700/113 |
| 2007/0150375 | A1 * | 6/2007 | Yang | G06Q 30/06 705/339 |
| 2007/0156536 | A1 * | 7/2007 | Alfandary | G06Q 20/203 705/22 |
| 2007/0187183 | A1 * | 8/2007 | Saigh | E04H 14/00 186/53 |
| 2009/0000912 | A1 * | 1/2009 | Battles | B65G 1/1371 198/431 |
| 2009/0095006 | A1 * | 4/2009 | Smith | F25D 23/063 62/259.1 |
| 2009/0141117 | A1 * | 6/2009 | Elberbaum | G07C 9/00571 348/14.04 |
| 2009/0299521 | A1 * | 12/2009 | Hansl | B65G 1/1378 700/215 |
| 2010/0241269 | A1 * | 9/2010 | Ham | G06Q 10/06375 700/214 |
| 2011/0192893 | A1 * | 8/2011 | Waugh | G06F 19/3462 235/375 |
| 2011/0258134 | A1 * | 10/2011 | Mendez | G06Q 50/12 705/332 |
| 2012/0143427 | A1 * | 6/2012 | Hoffman | G06Q 10/08 701/23 |
| 2013/0073477 | A1 * | 3/2013 | Grinberg | A47G 29/141 705/332 |
| 2013/0262252 | A1 * | 10/2013 | Lakshman | G06Q 10/08 705/26.1 |
| 2013/0262336 | A1 * | 10/2013 | Wan | G06Q 10/0836 705/339 |
| 2013/0302132 | A1 * | 11/2013 | D'Andrea | G06Q 10/08 414/807 |
| 2013/0317642 | A1 * | 11/2013 | Asaria | G06Q 10/08 700/216 |
| 2014/0032034 | A1 | 1/2014 | Raptopoulous et al. | |
| 2014/0067618 | A1 * | 3/2014 | Zhang | G06Q 30/06 705/26.81 |
| 2014/0089077 | A1 * | 3/2014 | Zuckerman | G07F 9/026 705/14.37 |
| 2014/0100769 | A1 * | 4/2014 | Wurman | G06Q 10/087 701/301 |
| 2014/0100999 | A1 * | 4/2014 | Mountz | G06Q 10/087 705/28 |
| 2014/0108287 | A1 | 4/2014 | Waddington et al. | |
| 2014/0178161 | A1 * | 6/2014 | Moosburger | B65G 1/1378 414/273 |
| 2014/0214195 | A1 * | 7/2014 | Worsley | B65G 1/1378 700/217 |
| 2014/0228999 | A1 * | 8/2014 | D'Andrea | G05D 1/0234 700/214 |
| 2014/0372258 | A1 * | 12/2014 | Elberbaum | G06Q 10/087 705/26.81 |
| 2015/0106291 | A1 * | 4/2015 | Robinson | G06F 21/62 705/339 |
| 2015/0158679 | A1 * | 6/2015 | Lossov | B65G 1/06 414/298 |
| 2015/0178676 | A1 * | 6/2015 | Carr | G06Q 10/0836 705/332 |
| 2015/0186840 | A1 * | 7/2015 | Torres | A47F 10/02 705/339 |
| 2015/0242591 | A1 * | 8/2015 | Davey | B25J 11/008 700/216 |
| 2015/0302511 | A1 * | 10/2015 | Lopez | G06Q 30/0635 705/26.81 |
| 2016/0009493 | A1 * | 1/2016 | Stevens | G05B 19/41865 700/216 |
| 2016/0027093 | A1 * | 1/2016 | Crebier | G06Q 50/28 705/26.81 |
| 2016/0063604 | A1 * | 3/2016 | Shaffer | G06Q 30/0639 705/14.57 |
| 2016/0071051 | A1 * | 3/2016 | Tibbs | G06Q 10/083 705/337 |
| 2016/0101940 | A1 * | 4/2016 | Grinnell | G05D 1/0289 700/216 |
| 2016/0104099 | A1 * | 4/2016 | Villamar | G06Q 50/28 705/26.81 |
| 2016/0107838 | A1 * | 4/2016 | Swinkels | B65G 1/1378 414/273 |
| 2016/0129587 | A1 * | 5/2016 | Lindbo | B65G 1/0464 700/218 |
| 2016/0224934 | A1 * | 8/2016 | Ramalingam | G06Q 30/0635 |
| 2016/0255969 | A1 * | 9/2016 | High | B07C 5/3422 |
| 2016/0286998 | A1 * | 10/2016 | Lindbo | G07F 9/105 |
| 2017/0106532 | A1 * | 4/2017 | Wellman | B25J 9/1697 |

(56) References Cited

U.S. PATENT DOCUMENTS

| | | | |
|---|---|---|---|
| 2017/0215620 A1* | 8/2017 | Dade | A47B 88/90 |
| 2017/0278055 A1* | 9/2017 | Winkler | G06Q 50/28 |
| 2017/0278176 A1* | 9/2017 | Valkov | B65B 35/10 |
| 2017/0304153 A1* | 10/2017 | Williamson | A61J 7/0084 |
| 2017/0320509 A1* | 11/2017 | Ryan | B65D 21/0223 |
| 2017/0322561 A1* | 11/2017 | Stiernagle | B65G 1/04 |
| 2018/0130017 A1* | 5/2018 | Gupte | G06Q 10/0836 |
| 2018/0365641 A1* | 12/2018 | Zhu | G06Q 10/0836 |
| 2019/0340561 A1* | 11/2019 | Rajkhowa | G06Q 10/06316 |

OTHER PUBLICATIONS

Sinha, "eCommerce Supply Chain Insights in Groceries and Consumer Packaged Goods in the United States", published by University of Michigan, on Feb. 2015 (Year: 2015).*

Non-Final Office Action for U.S. Appl. No. 15/595,444, dated Mar. 29, 2018, 6 pgs.

Notice of Allowance for U.S. Appl. No. 15/595,444, dated Jun. 12, 2018, 8 pgs.

International Patent Application No. WO 2017/197285, with search report, filed Nov. 16, 2017. 55 pages.

International Search Report and Written Opinion directed to International Patent Application No. PCT/US2017/032868, dated Aug. 2, 2017; 9 pages.

International Patent Application No. WO 2017/201025, with search report, filed Nov. 16, 2017. 51 pages.

International Search Report and Written Opinion directed to International Patent Application No. PCT/US2017/032445, dated Aug. 16, 2017; 7 pages.

* cited by examiner

SYSTEMS AND METHODS FOR DELIVERY OF ONLINE ORDERS

RELATED APPLICATIONS

In full or in part, this application describes the same apparatus and method as presented in U.S. provisional patent application No. 62/335,450, filed on May 12, 2016, and claims priority thereto. The subject matter of which is hereby incorporated herein by reference and is made a part hereof in its entirety.

FIELD

The present disclosure is directed to systems and methods for delivery for online orders. Specifically, the disclosure is directed to automated material handling systems for delivering online orders to customers.

BACKGROUND

Conventional online order delivery systems present in the current grocery industry face significant challenges in responding to requests for timely, accurate and smooth delivery, while keeping delivery costs low.

A major portion of online orders is being home delivered. But customers are not always available at home to receive the delivery and in general there is a growing reluctance to paying the additional fees requested from the retailers to cover the additional costs to deliver.

Another method of delivery for online orders is conducting the delivery at click-&-collect (or drive through) units which are in store, adjacent to the store and in some scenarios, away from the existing retailer's stores. In such scenarios, the retailer transfers a number of orders to the unit where operators place the orders on racks using barcode based handling systems. The customer is then required to visit the unit within a predetermined time slot and an operator following a concrete procedure delivers the ordered goods. Unfortunately, for the retailers using this method, the final cost is greater than that of the conventional business model where the customer is visiting the store and collecting the items from the shelves by himself. This higher cost combined with the established customers' attitude where they want to pay store prices for online purchases and the razor thin margin of this industry results in making online orders and deliveries non-profitable for grocery retailers.

An additional drawback related with the manually operated click-and-collect systems is the difficulty to handle returns, i.e. the process that a customer needs to follow when returning one or more products purchased via an online order is much more complicated.

Another option for delivery of online orders is the use of lockers. The customers, upon placing the online order, receive a delivery code designating the place and the time slot to fetch the ordered items. Then, the customer visits the designated locker during the predefined time slot and picks up his/her order. This method has a number of advantages compared to the other methods in use. However, locker systems present issues such as low storage capacity and relatively high cost of replenishment.

SUMMARY

According to an aspect of an exemplary embodiment, a method for delivery of an online order performed by at least one machine comprising at least one processor includes receiving, using at least one of said at least one processor, identification information from a customer at a control panel, authenticating, using at least one of said at least one processor, the customer, retrieving at least one container incorporating items belonging to an online order placed by the customer based on the authentication, transporting the least one container from the retrieved location to a delivery station connected to the control panel, and outputting the at least one container for pick-up by the customer.

According to another exemplary embodiment, the authentication is performed using at least one of near field communication (NFC) technology, voucher identification and Quick Response (QR) scanning.

According to another exemplary embodiment, the customer identification information is received at the control panel which further comprises a screen for data input and at least one delivery drawer.

According to another exemplary embodiment, the retrieving further comprises at least one mobile robotic unit (MRU) fetching an inventory carrier including the at least one container and transferring the inventory carrier at a mini-load station.

According to another exemplary embodiment, the transporting further comprises the mini-load station transferring the at least one container from the inventory carrier to a delivery carrier and the delivery carrier transferring the at least one container to the delivery station connected to the control panel.

According to another exemplary embodiment, the outputting further comprises transferring the at least one container from the delivery carrier to the at least one delivery drawer.

According to another exemplary embodiment, the method includes locking the at least one delivery drawer, using at least one electromagnet, while the at least one container is being transferred from the delivery carrier to the at least one delivery drawer.

According to another exemplary embodiment, the method includes opening the at least one delivery drawer, using at least one of said at least one processor, upon completion of the transfer of the at least one container from the delivery carrier to the at least one delivery drawer.

According to another exemplary embodiment, the method includes, if a number of the at least one containers is greater than the holding capacity of the delivery carrier, performing the transporting and the outputting a plurality of times till each of the at least one container is transferred to the delivery drawer.

According to another exemplary embodiment, the method includes receiving, using at least one of said at least one processor, a request to cancel delivery from the customer, detecting, using at least one of said at least one processor, whether the at least one delivery drawer is open, and cancelling the delivery of the at least one container based on the detection.

According to another exemplary embodiment, the method includes displaying on the screen, using at least one of said at least one processor, if the at least one delivery drawer is detected to be open, a message informing the customer that the delivery cannot be cancelled.

According to another exemplary embodiment, the method includes cancelling the delivery, using at least one of said at least one processor, if the at least one delivery drawer is detected to be open.

According to an aspect of an exemplary embodiment, a system for delivery of an online order includes a control panel, a memory containing machine readable medium comprising machine executable code having stored thereon instructions for delivery of an online order, and at least one processor coupled to the memory, the at least one processor configured to execute the machine executable code to cause the at least one processor to receive identification information from a customer at the control panel, authenticate the customer, retrieve at least one container incorporating items belonging to an online order places by the customer based on the authentication, transport the least one container from the retrieved location to a delivery station connected to the control panel, and output the at least one container for pick-up by the customer.

According to another exemplary embodiment, the at least one processor is further configured to execute the machine executable code to cause the at least one processor to authenticate the customer using at least one of near field communication (NFC) technology, voucher identification and Quick Response (QR) scanning.

According to another exemplary embodiment, the customer identification information is received at the control panel which further comprises a screen for data input and at least one delivery drawer.

According to another exemplary embodiment, the system includes at least one mobile robotic unit (MRU), an inventory carrier, and a mini-load station, wherein the at least one processor is further configured to execute the machine executable code to cause the at least one processor to fetch, using the at least one mobile robotic unit (MRU), the inventory carrier including the at least one container and transferring the inventory carrier at the mini-load station.

According to another exemplary embodiment, the system includes a delivery carrier, wherein the at least one processor is further configured to execute the machine executable code to cause the at least one processor to transfer, using the mini-load station, the at least one container from the inventory carrier to a delivery carrier, and transfer, using the delivery carrier, the at least one container to the delivery station connected to the control panel.

According to another exemplary embodiment, the at least one processor is further configured to execute the machine executable code to cause the at least one processor to transfer the at least one container from the delivery carrier to the at least one delivery drawer.

According to another exemplary embodiment, the system includes at least one electromagnet, wherein the at least one processor is further configured to execute the machine executable code to cause the at least one processor to lock the at least one delivery drawer, using the at least one electromagnet, while the at least one container is being transferred from the delivery carrier to the at least one delivery drawer.

According to another exemplary embodiment, the at least one processor is further configured to execute the machine executable code to cause the at least one processor to open the at least one delivery drawer upon completion of the transfer of the at least one container from the delivery carrier to the at least one drawer.

According to another exemplary embodiment, the at least one processor is further configured to execute the machine executable code to cause the at least one processor to, if a number of the at least one containers is greater than the holding capacity of the delivery carrier, perform the transport and the output a plurality of times till each of the at least one container is transferred to the at least one delivery drawer.

According to another exemplary embodiment, the at least one processor is further configured to execute the machine executable code to cause the at least one processor to receive a request to cancel delivery from the customer, detect whether the at least one delivery drawer is open, and cancel the delivery of the at least one container based on the detection. According to another exemplary embodiment, the at least one processor is further configured to execute the machine executable code to cause the at least one processor to display on the screen, if the at least one delivery drawer is detected to be open, a message informing the customer that the delivery cannot be cancelled.

According to another exemplary embodiment, the at least one processor is further configured to execute the machine executable code to cause the at least one processor to cancel the delivery, if the at least one delivery drawer is detected to be open.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
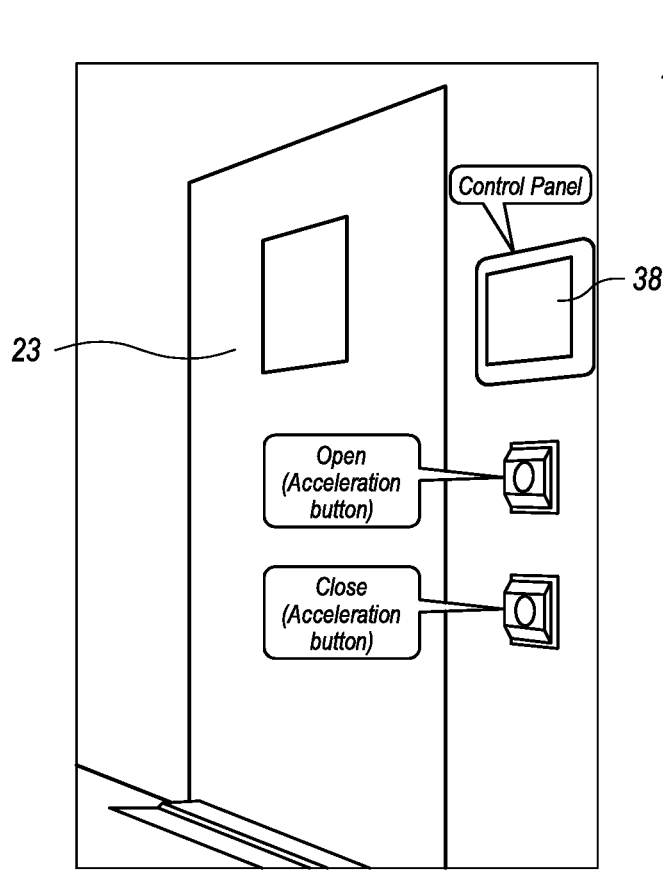
FIG. 1 illustrates the replenishment station 1, according to an exemplary embodiment.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Figure 2:
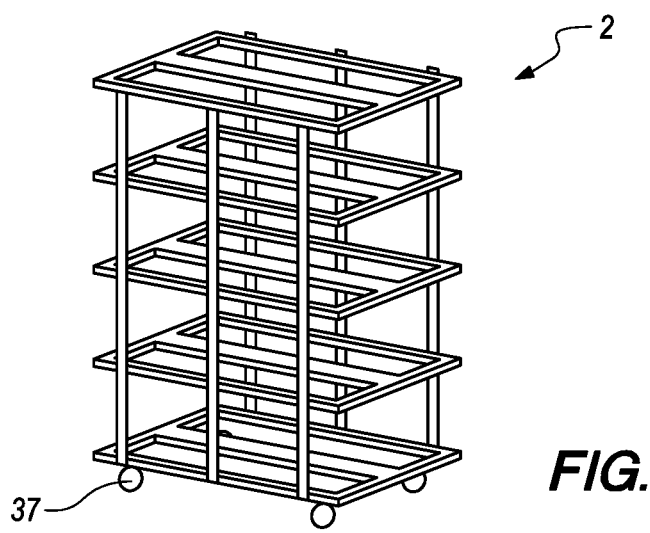
FIG. 2 illustrates an empty, wire-cage configuration of an inventory carrier 3, according to an exemplary embodiment.
Figure 3:
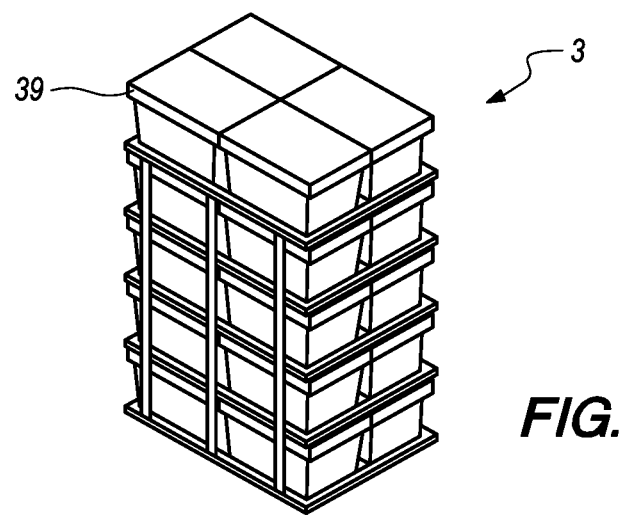
FIG. 3 illustrates an inventory carrier 3 with containers 39, according to an exemplary embodiment.
Figure 18:
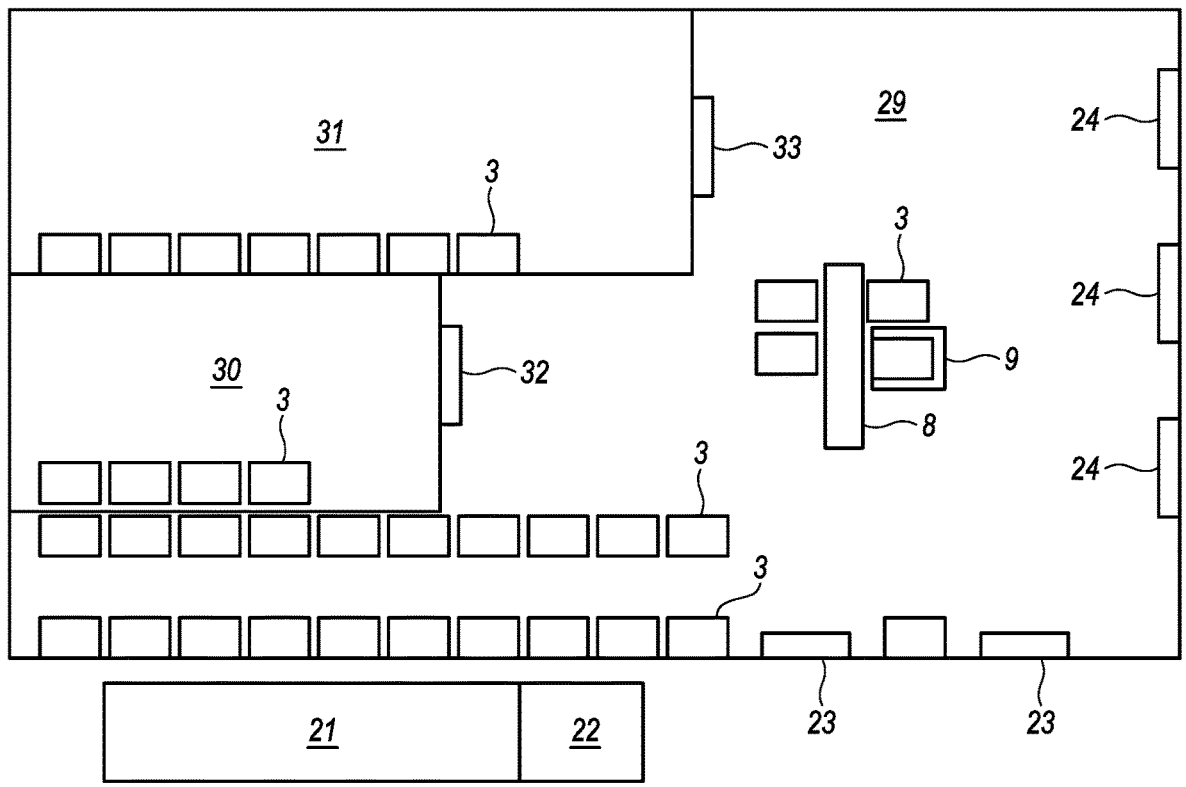
FIG. 18 depicts a floor plan of replenishment pod, according to an exemplary embodiment.
Figure 19:
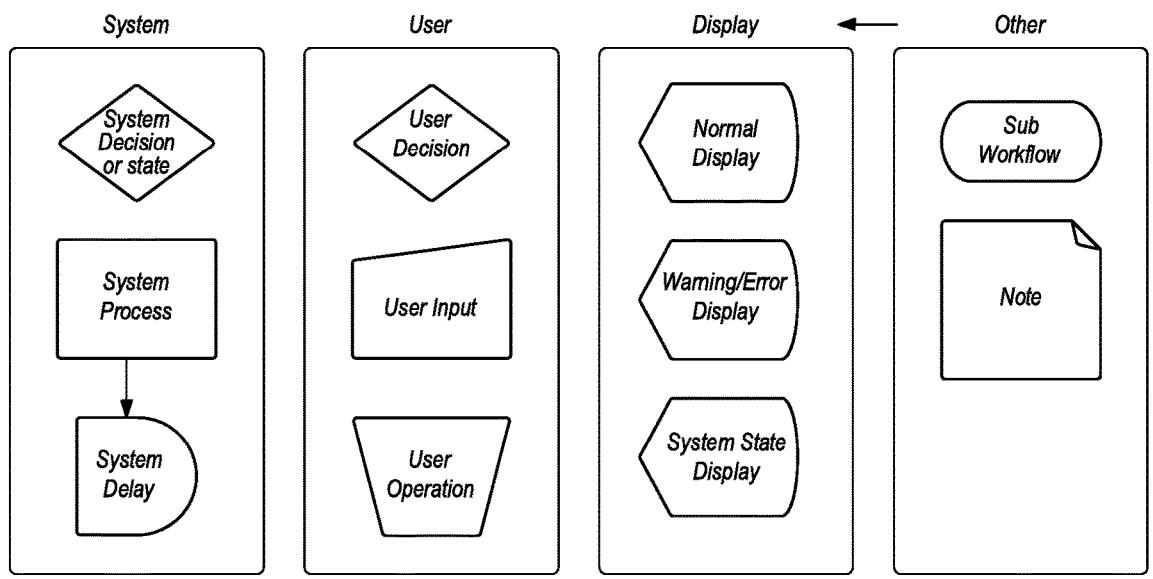
FIG. 19 depicts a legend for the pod replenishment processes described in FIGS. 20-26.

In accordance with certain embodiments, the disadvantages and/or problems associated with existing conventional online order delivery systems may substantially be reduced or eliminated. With reference to FIG. 3, when an online order is placed by a customer, one or more containers 39, on an inventory carrier 3, are delivered, for example by truck, from a fulfillment center (not shown) to a pod 35 (FIG. 18). The customer, at a convenient time, is then able to pick up the order at the delivery hatch 24 of pod 35. By stacking the containers 39 as shown, using an inventory carrier 3 having a wire frame 2 (FIG. 2), container handling and shipping efficiency is scaled up by a factor of 15×-30× depending on the number of containers carried by a wire frame.

Figure 4:
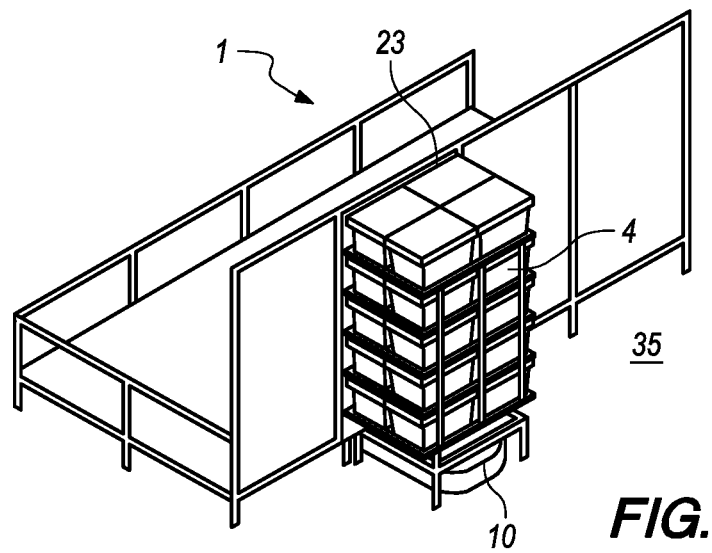
FIG. 4 illustrates an inventory carrier 3 placed on to a carrier base 5 at a replenishment hatch (RH) 23 of station 1. Underneath the carrier base is a Mobile Robotic Unit (MRU) 10, according to an exemplary embodiment.
Figure 5:
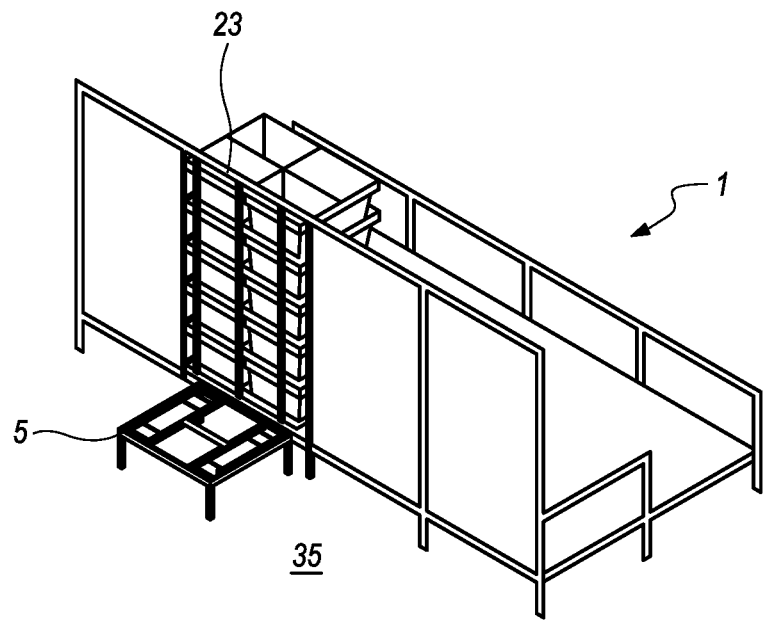
FIG. 5 illustrates an inventory carrier 3 loaded with containers right outside the RH entrance 1 and a carrier base 5 placed at the RH slot, according to an exemplary embodiment.
Figure 6:
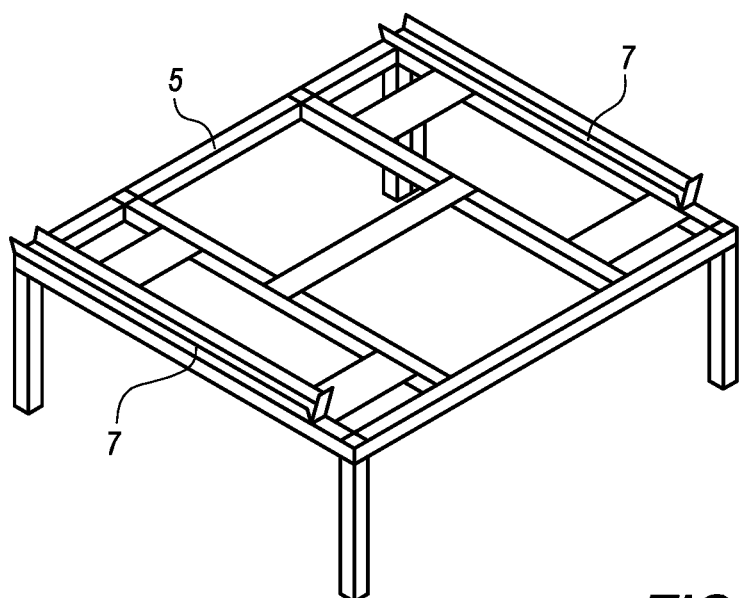
FIGS. 6 and 7 illustrate a carrier base 5. On the top sides or the carrier base the two guiding rails 7 for the inventory carrier wheels 3 are shown, according to an exemplary embodiment.
Figure 7:
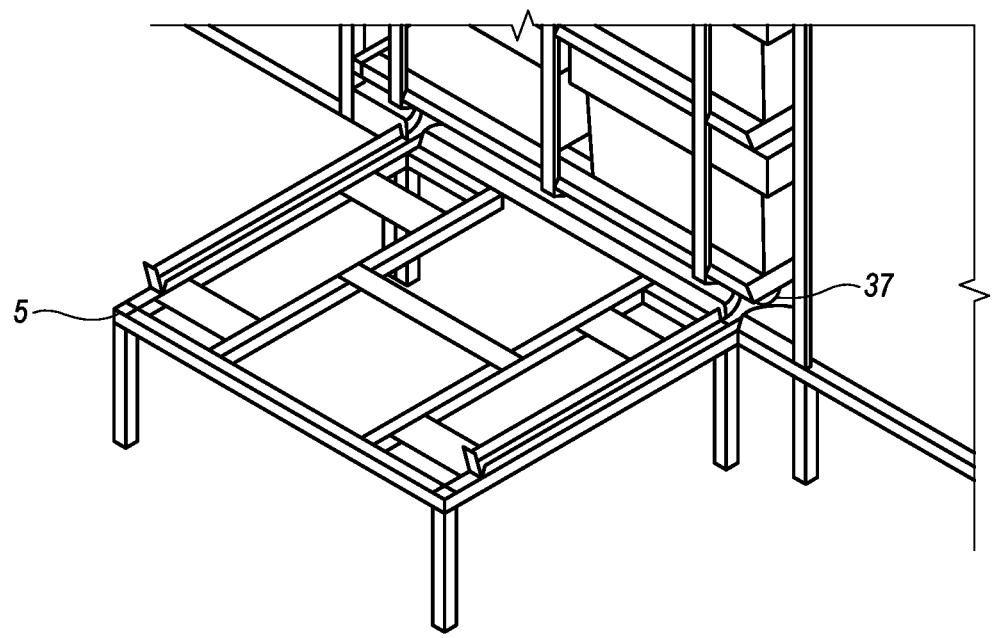

In accordance with one embodiment, a method for feeding the inventory carriers 3 into a pod 35 includes delivering the inventory carriers 3 to a designated replenishment hatch 23 of a replenishment station 1 (FIG. 1, FIG. 4 and FIG. 5) of the pod. The inventory carriers 3 are placed onto a carrier base 5 (FIGS. 5-7) in the pod 35. Two special rails 7 (FIG. 6) are attached on the sides of the upper surface of the carrier base 5 to guide wheels 37 (FIGS. 2 and 7) of inventory carrier 3 into the correct position and lock them there so that the inventory carrier 3 remains securely coupled with the carrier base 5 while being transferred by a mobile robotic unit (MRU) 10 within the pod 35 to be put at a proper temperature room. As shown in the plan view of FIG. 18, in pod 35, there are three temperature zone areas, one for non-perishable items 29, a second one for fresh 30 and a third one for frozen 31. Also shown in FIG. 18 are replenishment hatch 23 through which the order is delivered from the fulfillment center to the pod 35, and delivery hatch 24 from which a customer picks up the order. Track 21 and unloading platform 22 for assisting delivery to the pod 35 are also shown. A chilled room automatic door 32 and a frozen room automatic door 33 are included.

In certain embodiments, a customer is identified using one of many available identification methods at the delivery hatch station 24, for example using an RFID tag carried by the customer, or using a security code entered by the customer, and so on. Once identified, the customer is given access to his/her order via the delivery hatch 24.

Figure 8:
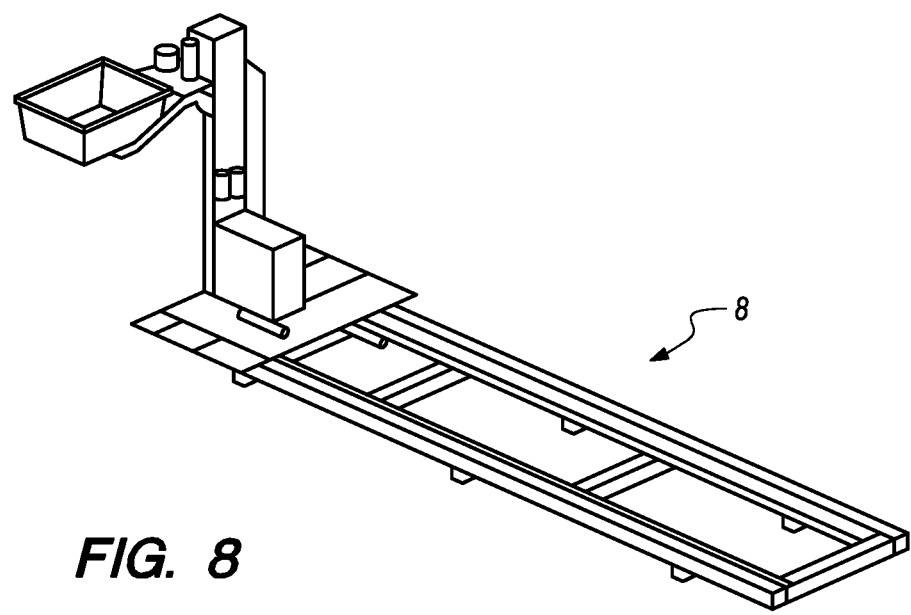
FIG. 8 illustrate a mini-load system 8 that is capable to handling containers, according to an exemplary embodiment.
Figure 9:
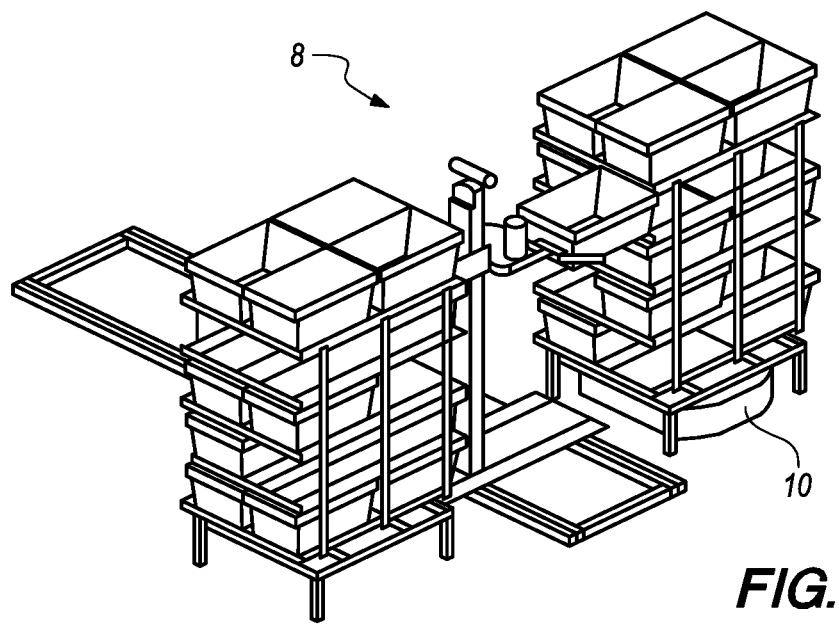
FIG. 9 illustrates a mini load (ML) station 8 with two inventory carriers 3. Mini-load is transferring containers from one inventory carrier to the other, according to an exemplary embodiment.
Figure 10:
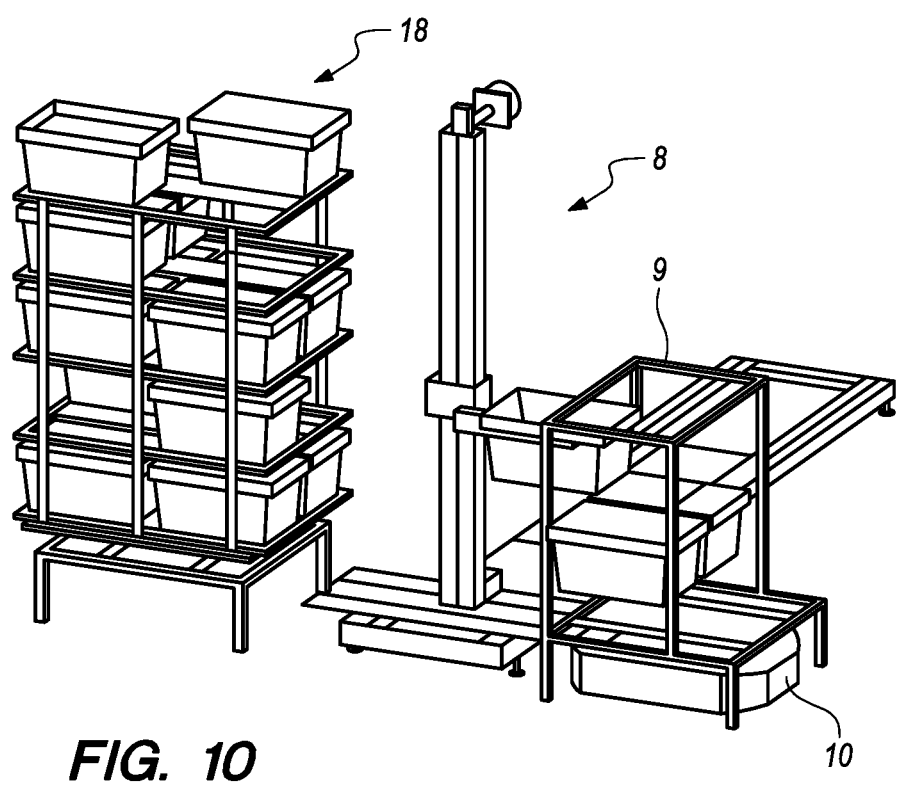
FIG. 10 illustrates a mini-load station 8 while fetching containers from an inventory carrier 3 and loading them onto a delivery carrier 9, according to an exemplary embodiment.
Figure 12:
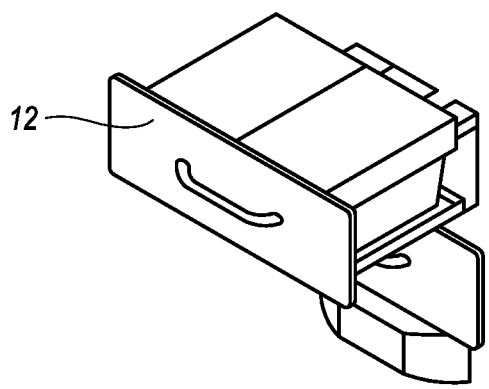
Figure 13:
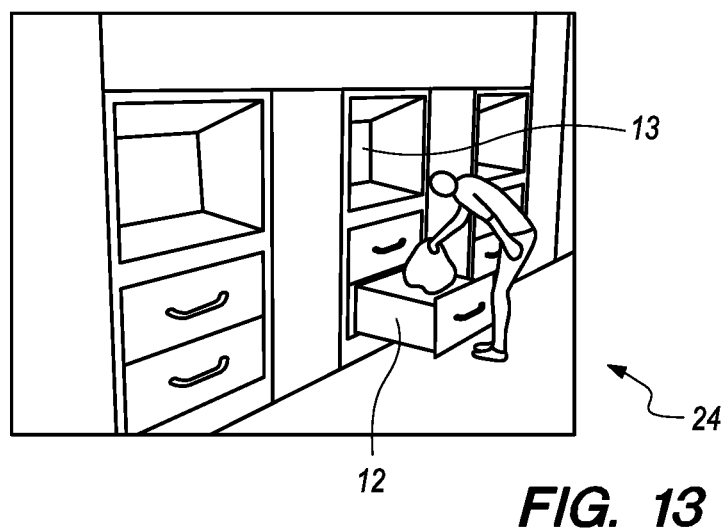
FIG. 13 illustrates the customer side of the delivery hatch 24 with the control panel 13 and the drawers 12 open while a customer is picking up her online order's items, according to an exemplary embodiment.
Figure 14:
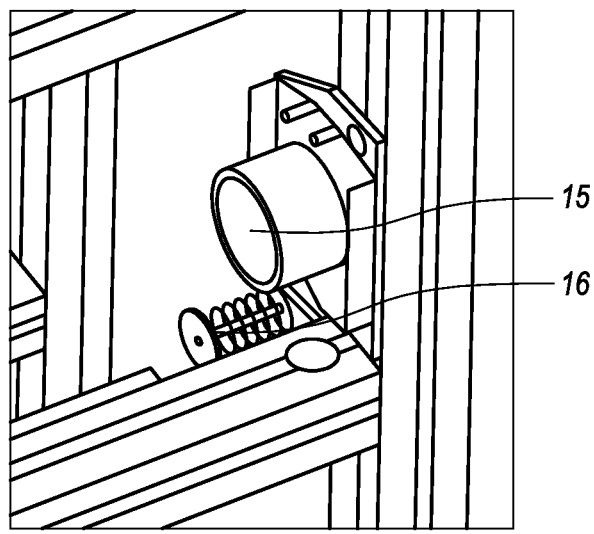
FIG. 14 illustrates the electromagnets 15 that lock the drawers and the spring 16 that pushes the drawer open when electromagnets 15 are deactivated, according to an exemplary embodiment.

In addition to the customer's identification, the method includes moving an inventory carrier 3 containing a number of containers 39 of a specific order to the mini load station 8 (FIGS. 8, 9 and 10). The mini load station 8 transfers the container(s) 39 of this specific order from the inventory carrier 3 on to a delivery carrier 9 (FIG. 10). Then an MRU 10 transfers the delivery carrier 9 and attaches it on a delivery hatch 24 (FIG. 12 and FIG. 13). The drawers 12 of the delivery hatch 24 open and the customer may retrieve the items. The delivery carrier 9 has a number of racks and its rack accommodates a number of containers. In a certain embodiment the delivery carrier 9 has two racks and each rack accommodates two containers.

Additionally, the method includes returning the delivery-frame 9 with the empty containers 39 of the delivered order back to the mini-load station 8 where the empty containers are moved from the delivery-frame 9 and placed on an inventory carrier 3 carrying empty containers to be returned back to the fulfillment center during the next replenishment cycle.

Technical advantages of certain embodiments of the present invention include the ability to receive an early message from a client denoting his/her estimated time of arrival though an email or a text message or other similar method. Then the system sorts out the containers 39 to be delivered and keeps them close to the delivery hatch 24 in such a way as to minimize the time needed to deliver the order when the customer finally arrives at the delivery hatch and claims his/her order.

In certain embodiments, the method includes loading vehicles for home delivery in a fully automated way. In a certain embodiment which provides loading inventory carriers 3 into a home delivery vehicle the driver identifies at the replenishment station 1 entrance panel 38 (FIG. 1) the itinerary to be loaded. A first inventory carrier 3 in the pod 35 is transferred to the replenishment hatch 23 of station 1 by an MRU 10, the door opens and the operator is instructed to pull out the inventory carrier 3 and load it onto the vehicle. The procedure is repeated likewise until all inventory carriers of the specific itinerary are loaded onto the vehicle.

In certain embodiments, the containers are loaded into a properly fitted home delivery vehicle 18 (FIG. 16) which provides for container 39 loading rather than inventory carrier 3 loading so that to maximize the loading capacity of the vehicle. Prior to loading those into the vehicle, the containers are relocated from the inventory carriers that they were originally placed at to new inventory carriers so that they are sorted in a Last In—First Out order (LIFO) based on the delivery itinerary details. This procedure is made possible by using the mini load station 8 guided by suitable algorithms. The operator pulls out the first inventory carrier 3 on the loading platform and places the containers onto a dynamic roller conveyor 17 (FIG. 15) which is equipped on a specific embodiment with a bar code scanner (not shown) fixed at the lower end of the conveyor. Other identification methods may be used as well. As soon as the first container is scanned the operator is guided via a visual "Put to Light" system regarding the exact spot to place it in. Same steps are followed for the remaining containers and then the process is repeated for each of the remaining inventory carriers 3. This way the containers are finally placed in a LIFO manner which greatly speeds up the delivery process at the several calls of the itinerary.

The details of the several processes relating to pod replenishment and delivery are described below.

Pod replenishment from fulfillment center—Orders have been picked and placed into containers 39 at a fulfillment Centre or a Dark Store or a Supermarket (not shown) prior to be sent to a pod 35. Inventory carriers 3 are used to ship the containers to a pod.

Upon arrival at the pod 35 the inventory carriers 3 are put into the system and stored in one of the following separate temperature rooms of the pod, according to an exemplary embodiment:

1) Ambient room 29—All inventory carriers 3 carrying non-perishable items are stored in this area (see FIG. 18—Ambient room 28)

2) Chilled room 30—All inventory carriers 3 carrying fresh items are stored in this area (see FIG. 18—Chilled room 30)

3) Frozen room 31—All inventory carriers 3 carrying frozen items are stored in this area (see FIG. 18—Frozen room 31)

Figure 20:
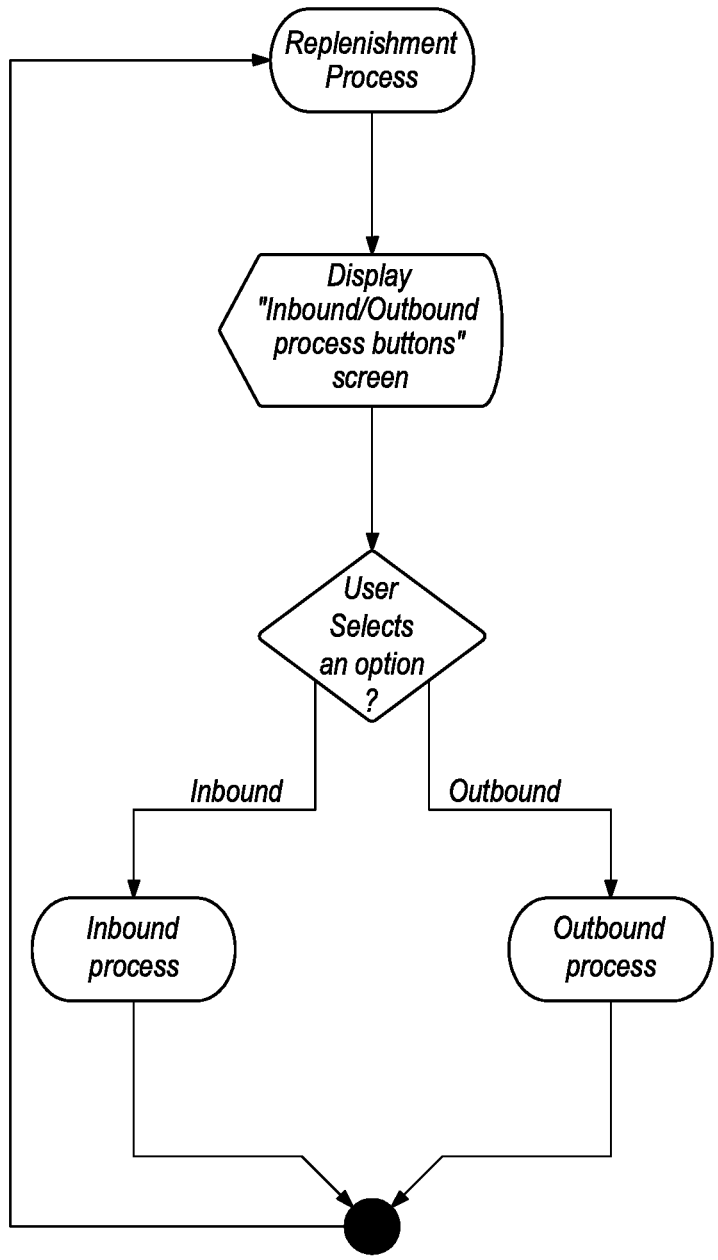
FIG. 20 depicts a flowchart describing the process to start replenishment, according to an exemplary embodiment.

Start replenishment (FIG. 20)—There are a number of scenarios regarding how exactly the inventory carriers 3 should be fed into the pod 35. The choice of the proper scenario depends on the inventory carrier capacity of the pod and the free hatches/slots 23 available at the time of replenishment.

Scenario 1: There are enough available hatches 23 for all the inventory carriers 3 of the specific shipment. All inventory carriers 3 will be fed into the pod 35 prior to pulling out inventory carriers 3 carrying empty containers to be returned to the fulfillment center.

Scenario 2: There are a number of available hatches 23 but this number is smaller than the inventory carriers 3 to be fed into. A number of inbound inventory carriers 3 will be fed in; then a number of outbound inventory carriers 3 will be pulled out. This intermittent process will go on up to the point when handling of all inbound and outbound inventory carriers 3 has been completed.

Scenario 3: There are no available free hatches 23 at all. A number of outbound inventory carriers 3 will be pulled out; then an equal number of inbound inventory carriers 3 will be fed in. This intermittent process will go on up to the point when handling of all inbound and outbound inventory carriers has been completed.

The control panel 38 next to the replenishment hatch 23 door 1 (FIG. 1) displays two software button options: Inbound and Outbound, according to an exemplary embodiment.

First assume that Scenario 1 applies and the operator selects "Inbound" to start the replenishment process.

Figure 21:
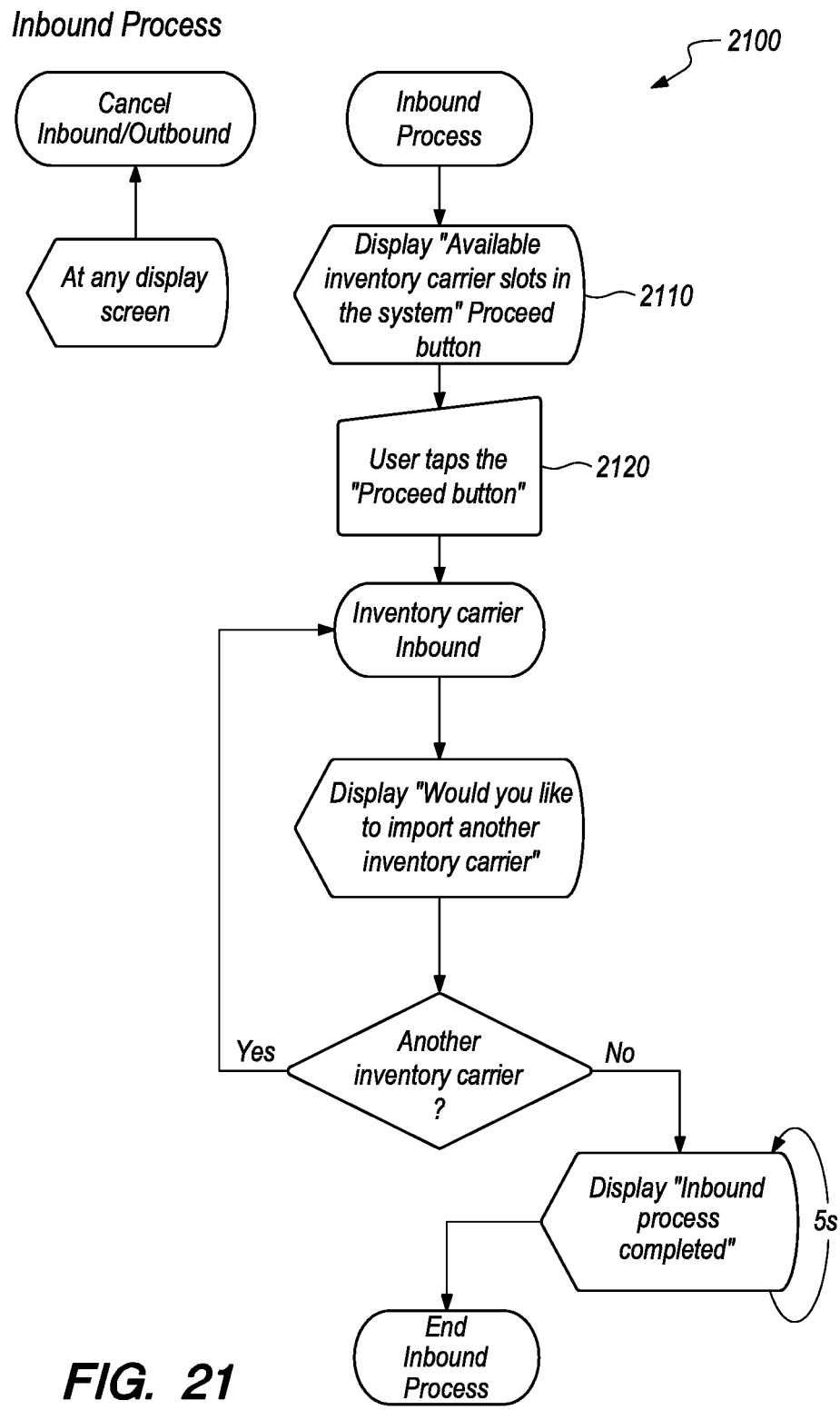
FIG. 21 depicts a flowchart describing the inbound process, according to an exemplary embodiment.

Inbound process (FIG. 21)—As analytically shown in the Inbound Process 2100 the Flow Charts (FIG. 21) inventory carriers 3 are fed into the system as follows:

1) The control panel 39 displays at 2110 the message "Available inventory carrier slots in the system" and prompts the operator to activate the "Proceed" button at 2120.

2) Inbound process is on and further steps are shown in the next section.

Figure 22A:
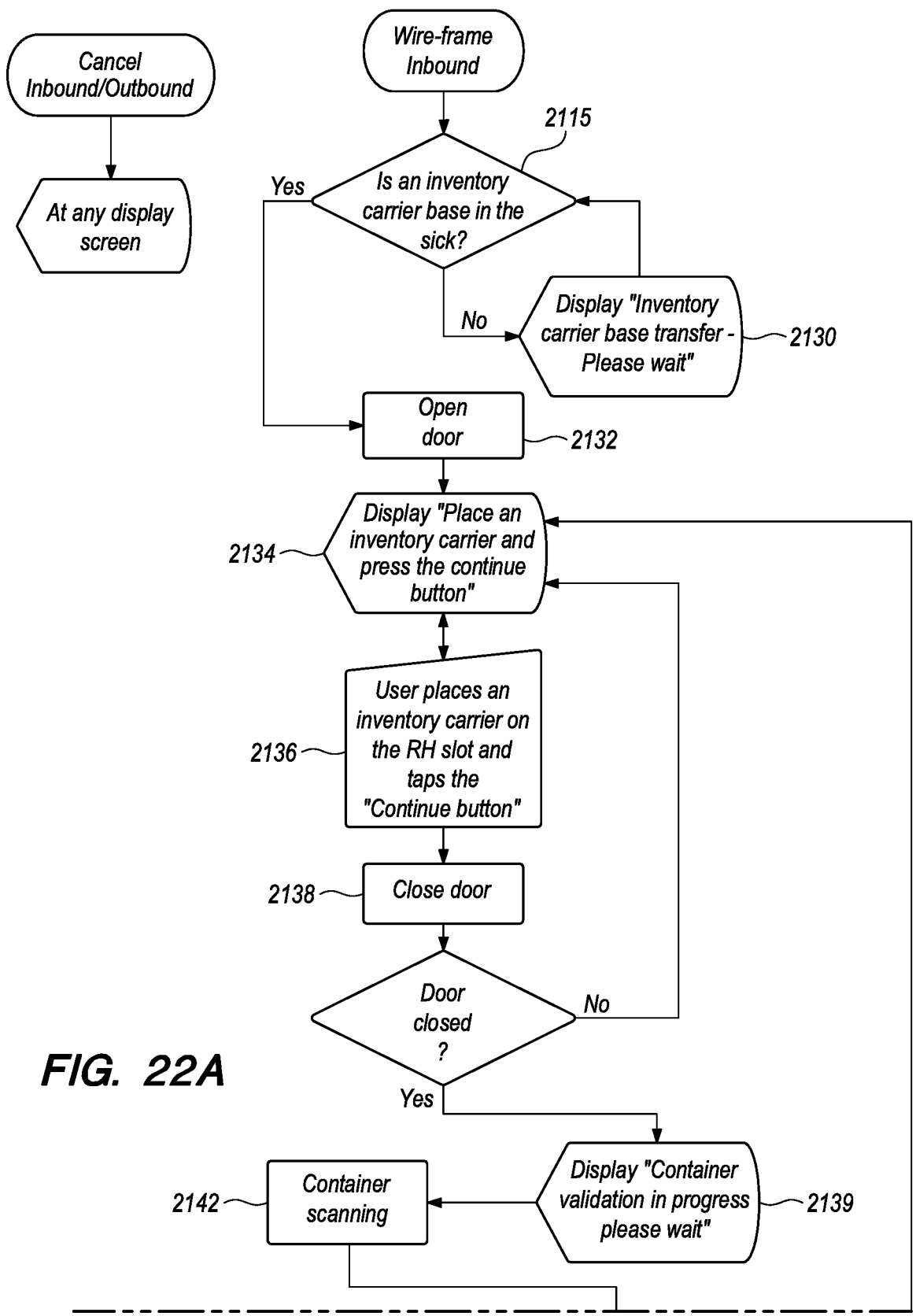
FIGS. 22A and 22B depict a flowchart describing the wire-frame/inventory carrier inbound process, according to an exemplary embodiment.
Figure 22B:
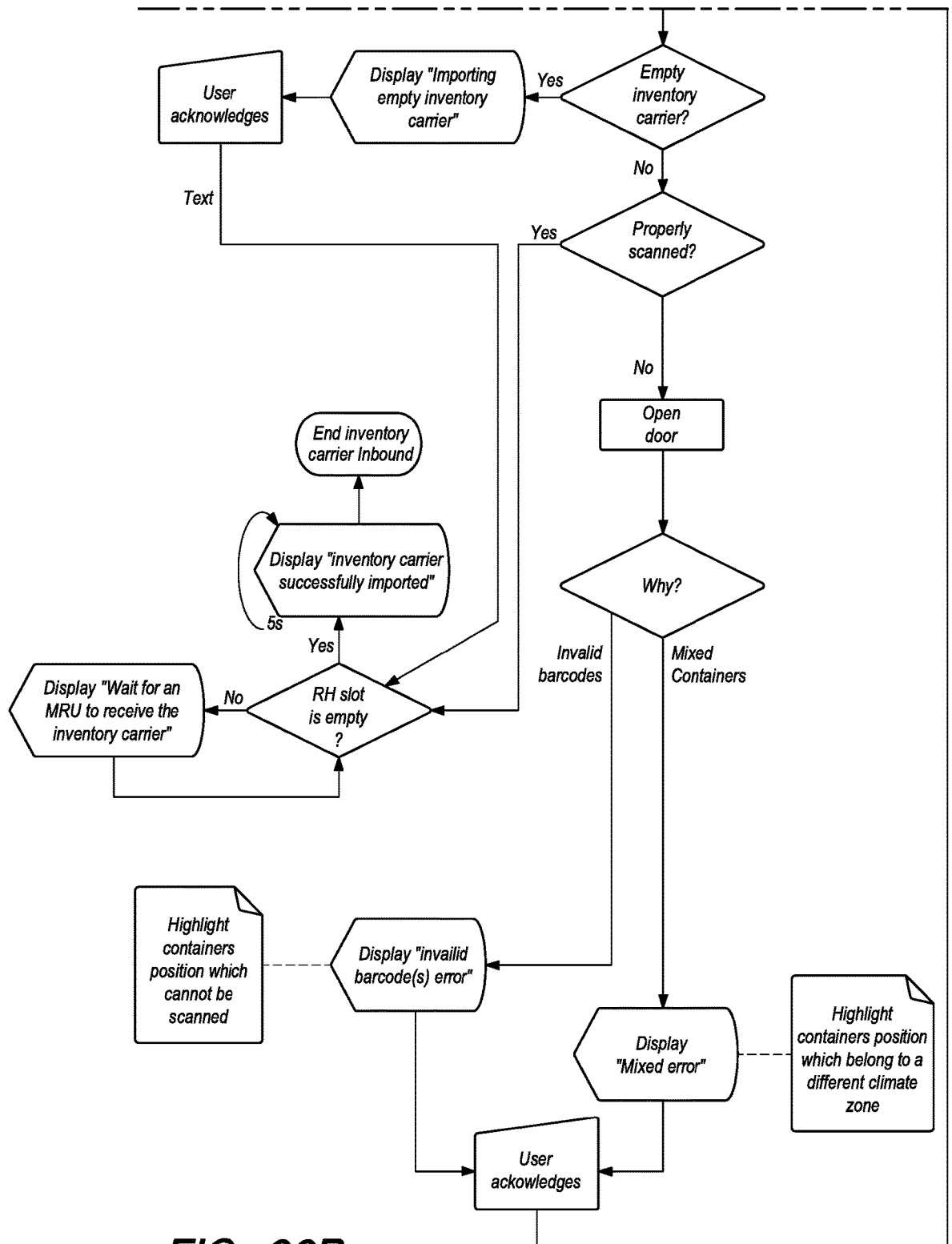

Inventory carrier inbound (FIGS. 22A and 22B)—An exemplary embodiment of the inventory carrier inbound process incorporates the following:

1) The hatch 23 opens automatically, provided that a carrier base 5 is already placed in position, as determined at 2115. If not, the control panel displays the message "Carrier base transfer—Please wait" at 2130.

2) Upon opening the hatch (2132), a new message appears on the control panel: "Place an inventory carrier and press the continue button" at 2134—The operator pushes, at 2136, an inventory carrier 3 on to the carrier base 5 making sure that the wheels are rolling through rail installed on the floor right in front of the entrance though to the rail guides 7 on the top of the carrier base 5. The front wheels of the inventory carrier 3 are eventually securely fastened into a cavity at the end of the rail course. This ends up to be a very tight coupling between the carrier base 5 and the wire-frame 2 of the carrier itself so that these two remain securely coupled so that an MRU 10 can safely move them within the pod 35. Other means of securely fastening the carrier and base together are also envisioned.

3) The operator presses the "Continue" button.

4) The hatch 23 closes at 2138.

5) The container validation process starts, and at 2139 a validation in progress message is displayed. By using image capture technology and a system of picturing devices (in one embodiment cameras placed on both sides of the entrance hatch 23) the system scans the containers 39 at 2142, by checking barcodes to verify that the correct containers are placed on the inventory carrier 3.

6) Upon successful verification the inventory carrier 3 is transferred by an MRU 10 to a proper empty location within the pod area 35—The inbound process for this first inventory carrier 3 is completed successfully and the same procedure is repeated (steps 1 through 6) for all the inbound pending inventory carriers 3.

7) In the case that the verification found unknown container(s) on an inventory carrier 3, the door re-opens and the operator is guided through the control panel 38 to remove the unknown container(s) and repeat the inbound process for that specific inventory carrier 3.

Figure 23:
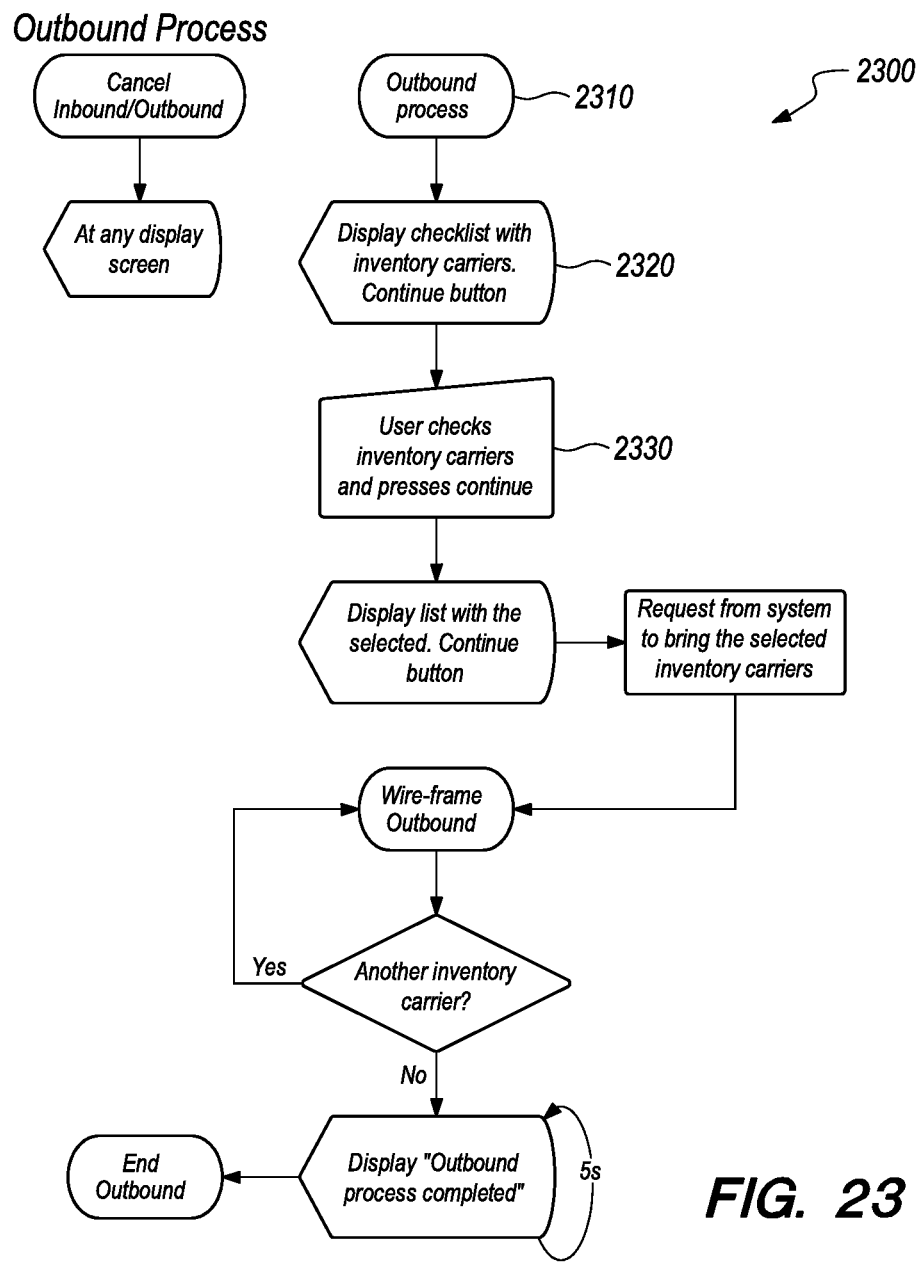
FIG. 23 depicts a flowchart describing the outbound process, according to an exemplary embodiment.

Outbound process (FIG. 23)—As analytically shown in the Outbound Process of the Flow Charts (FIG. 23) inventory carriers 3 are pulled out of the pod 35 as follows, according to an exemplary embodiment:

1) The operator activates the outbound process by choosing at 2310 the "Outbound process" button on the control panel 38 during the "Start Replenishment" procedure.

2) A checklist with inventory carriers 3 to be removed from the pod 35 is displayed on the control panel 38 at 2320.

3) The operator checks the list of the inventory carriers 3 and taps the "Continue" button at 2330.

4) Inventory carrier outbound process commences.

Figure 24:
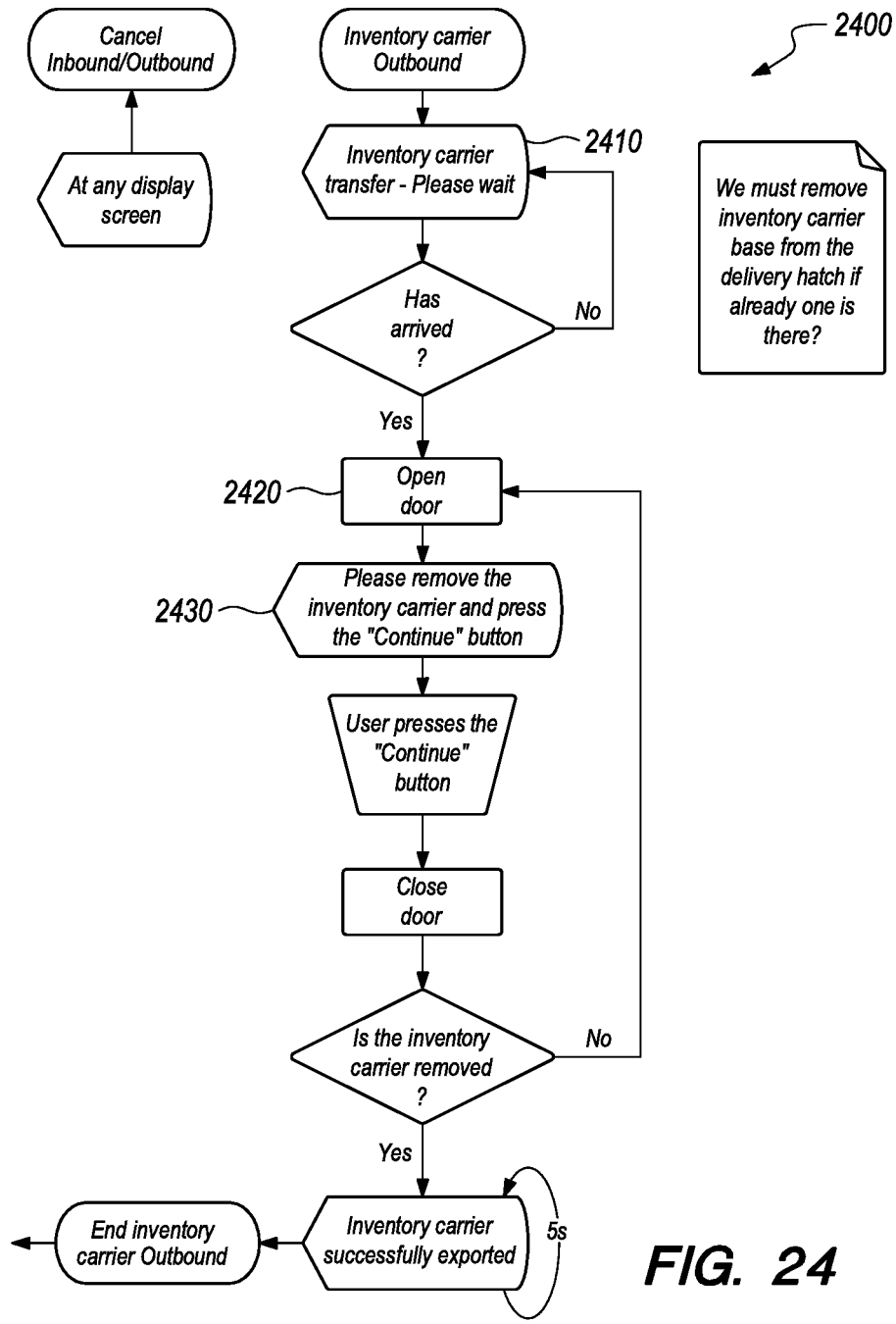
FIG. 24 depicts a flowchart describing the wire-frame/inventory carrier outbound process, according to an exemplary embodiment.

Inventory carrier outbound (FIG. 24)—An exemplary embodiment of the inventory carrier outbound process 2400 incorporates the following:

1) The control panel displays at 2410 the message "Inventory carrier transfer—Please wait".

2) As soon as an inventory carrier 3 has been transferred at the replenishment hatch 23 the hatch opens automatically at 2420.

3) The control panel displays the message "Please remove the inventory carrier and press the continue button" at 2430.

4) Upon completion of Step 3 the door closes and a new cycle starts back from Step 1 above for the next inventory carrier 3 to be removed from the pod 35.

Figure 25:
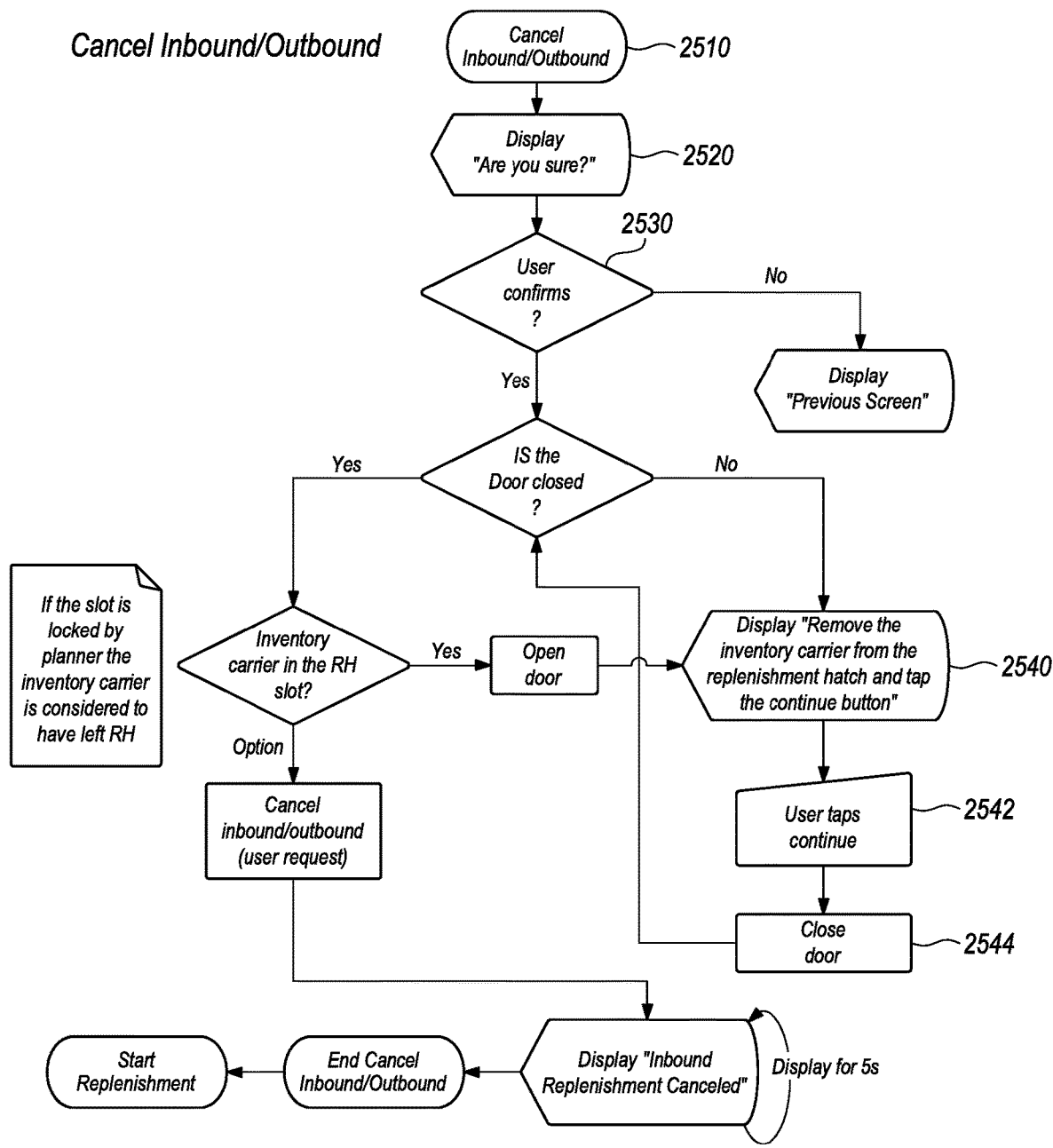
FIG. 25 depicts a flowchart describing the process to cancel the inbound or outbound procedure, according to an exemplary embodiment.

Cancel inbound/outbound (FIG. 25)—In case the operator needs to cancel the ongoing procedure, either it is inbound or outbound, needs to go through the following steps, according to an exemplary embodiment:

1) At any display screen there is available the soft button "Cancel Inbound/Outbound". To cancel the process operator activates this button at 2510.

2) A confirmation message depicting "Are you sure" is displayed on the control panel at 2520. Operator confirms at 2530.

3) If the RH door 23 opens and the message "Remove the inventory carrier from the RH and tap the continue button" displays on the control panel at 2540.

4) The operator pulls out the inventory carrier and taps continue at 2542.

5) The door closes at 2544 and the procedure (either inbound or outbound) terminates.

Figure 26:
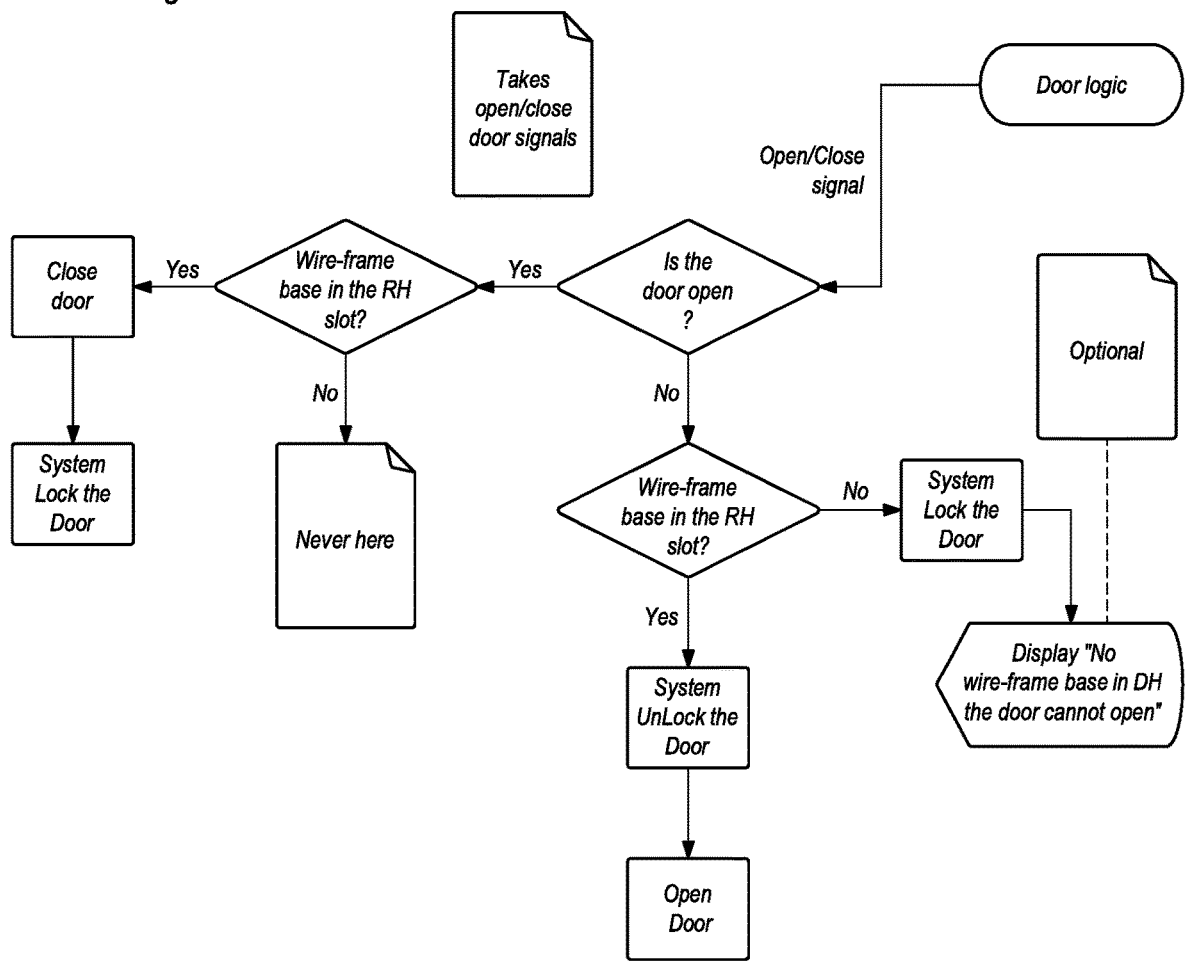
FIG. 26 depicts a flowchart describing the door logic, according to an exemplary embodiment.
Figure 27:
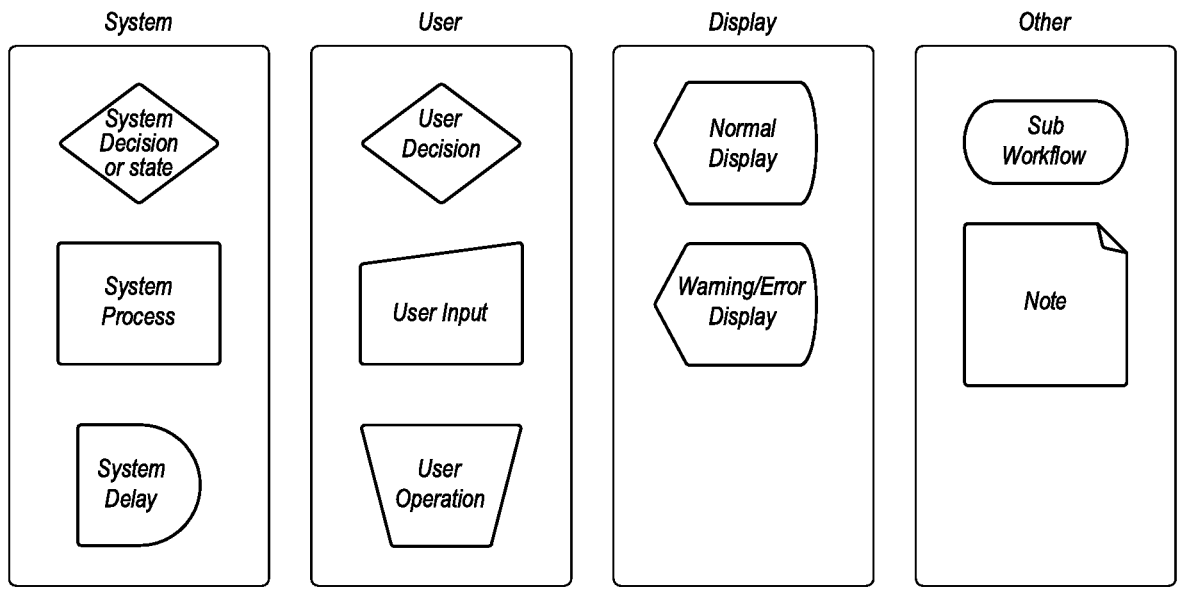
FIG. 27 depicts a legend for the order delivery processes described in FIGS. 28-33, according to an exemplary embodiment.

Door logic (FIG. 26)—The replenishment hatch door 23 is either automatically or manually operated following the specific logic displayed in the "Door Logic" flow chart depicted in FIG. 26.

The processes pertaining to the delivery of the online order to the customer are described below with reference to the flowcharts depicted in the drawings. According to an exemplary embodiment of the overall delivery process, a customer arrives within a pre-selected time slot at the pod 35 to receive his/her order through a delivery hatch delivery hatch 24 which consists of the following parts:

1) A control panel 13 (FIG. 13). In a specific embodiment the control panel could feature a touch screen. In another embodiment the control panel could feature a normal screen equipped with hard keys.

Figure 11:
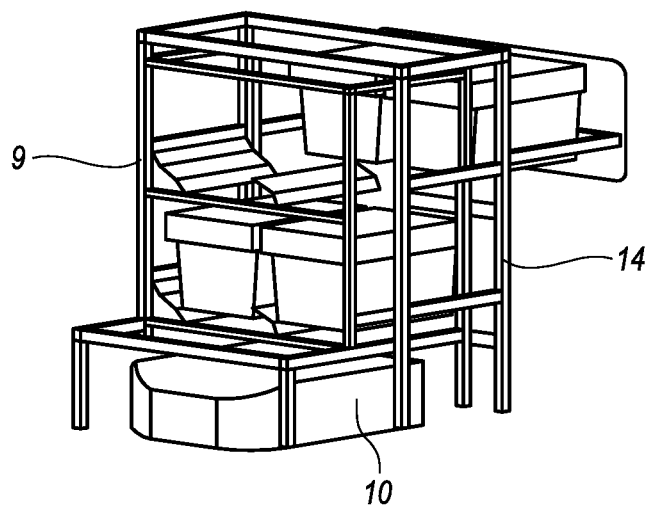
FIGS. 11 and 12 illustrate a delivery carrier 9 propelled by an MRU 10 to a delivery hatch 24—Drawers 12 are shown wide open and ready for the customer to pick up the items, according to an exemplary embodiment.

2) A fixed structure (FIG. 11) consisting of:

a) A specially designed frame 14 to coupleable to the delivery carrier (FIG. 11 and FIG. 12) carrying the order containers.

b) Two drawers 12 (FIG. 12 and FIG. 13) each one capable to contain a number of containers 39 depending on their sizes. In a specific embodiment each drawer contains two containers.

3) A delivery carrier 9 to carry the order containers 39 and place them into the drawers 12.

The order delivery process contains the following process phases.

Customer sign-in (FIGS. 28A and 28B)—Customer is prompted to sign in through the following process, according to an exemplary embodiment:

1) The control panel 13 displays the message a sign in message at 2802.

2) The customer taps the "Receive order" button at 2804. The button might be a software button on the touch screen or a hard button placed in the periphery around the control panel 13.

3) The control panel 13 displays the message "Sign in method selection" at 2806. The customer is prompted to select a method from a list of methods which includes but is not limited to:

3a) NFC (Near Field Communication)

3b) Voucher identification

3c) QR scanning

Figure 28A:
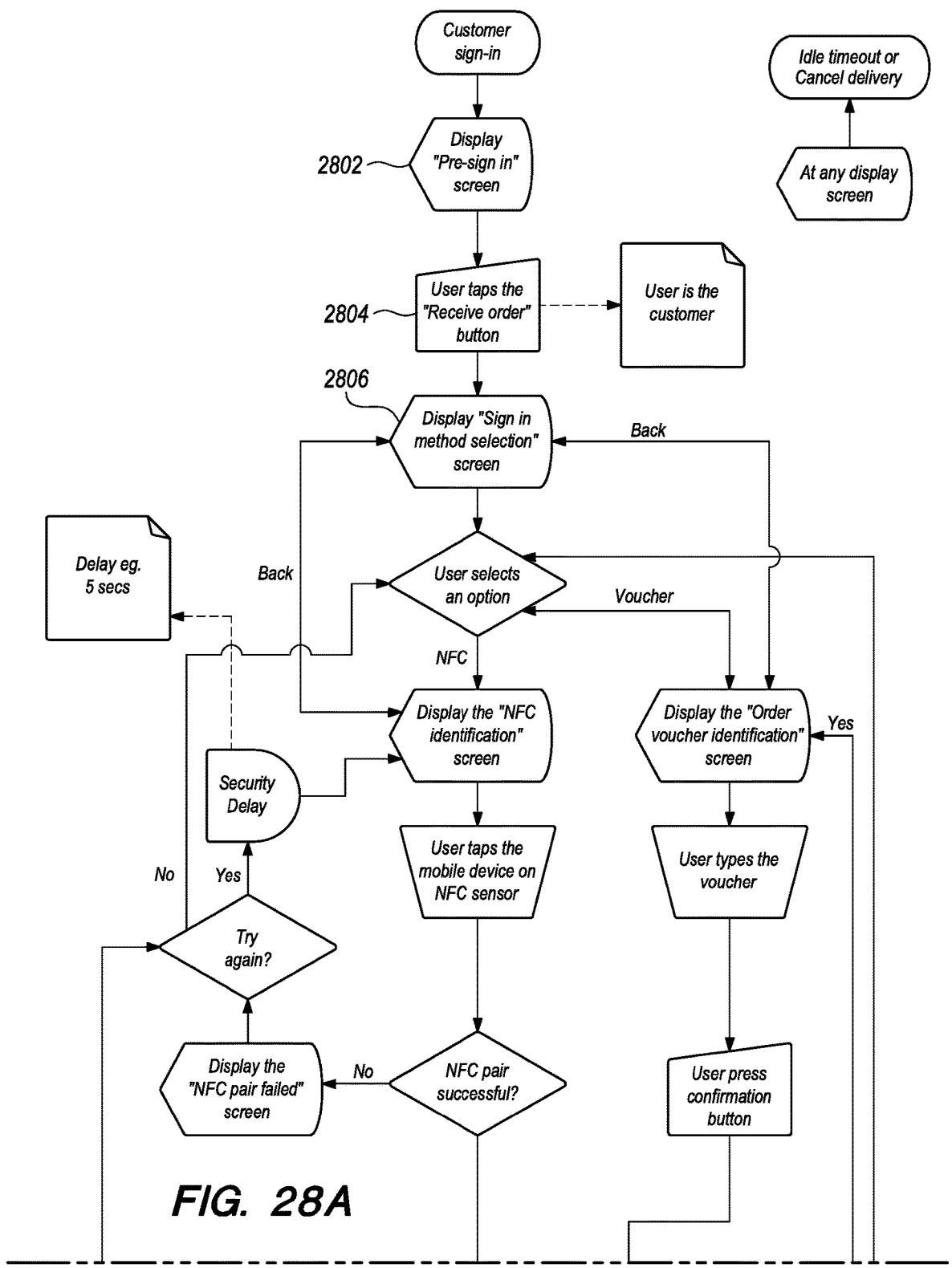
FIGS. 28A and 28B depict a flowchart describing the customer sign-in process, according to an exemplary embodiment.
Figure 28B:
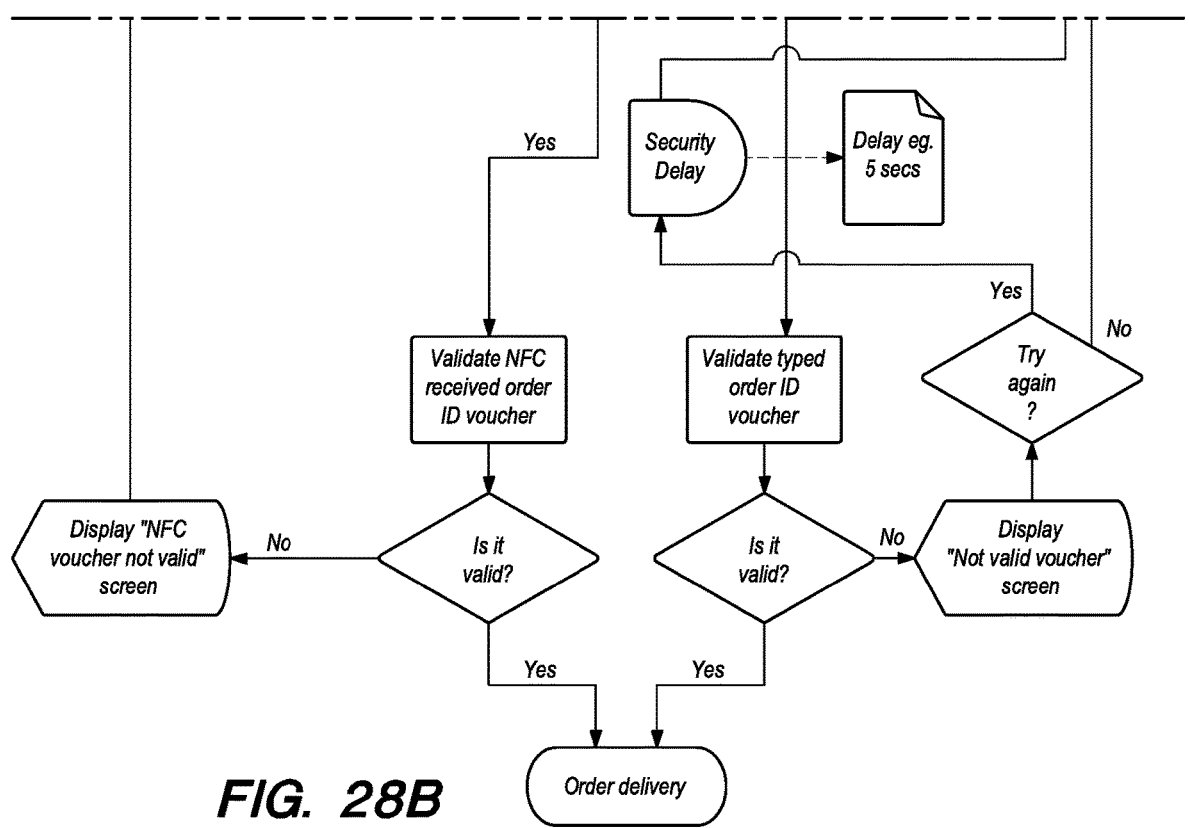

A number of other identification methods may be used to identify the customer/order to be delivered. An exemplary embodiment of the identification procedure is further shown in details on "Customer sign-in" flow chart (FIGS. 28A and 28B).

Figure 29:
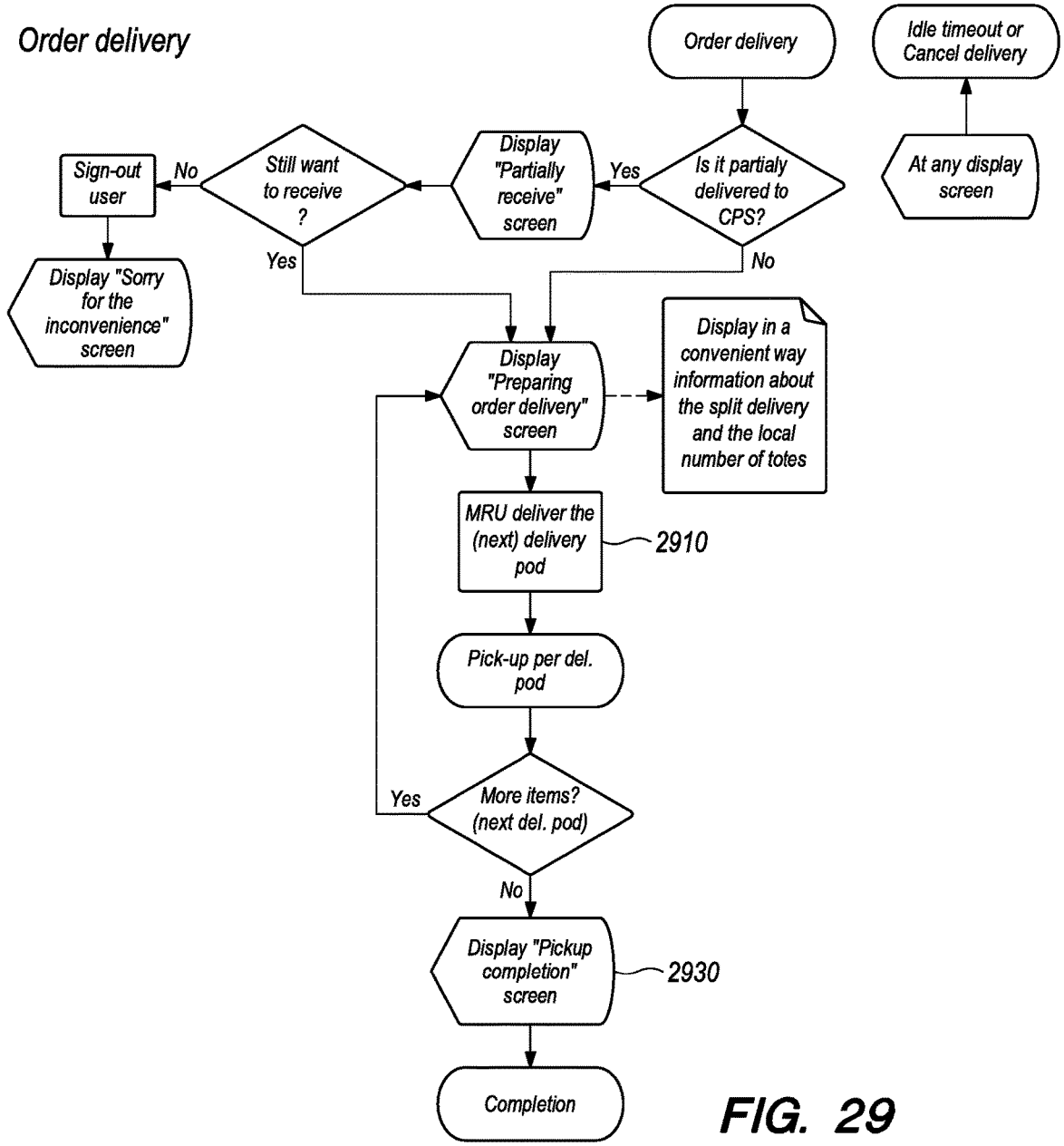
FIG. 29 depicts a flowchart describing the order delivery process, according to an exemplary embodiment.

Order delivery (FIG. 29)—Depending on the number of containers of the specific order to be delivered, delivery could be concluded in one delivery cycle or more. Each delivery cycle has the following steps, according to an exemplary embodiment:

1) One or more MRUs 10 fetch the wire-frames/inventory carriers 3 that hold containers of the specific order and transfer them at a mini-load station 8. Each Pod 35 contains one or more mini-load stations, the number depending on the throughput capacity needed.

2) Another MRU 10 fetches an empty delivery carrier 9 and transfers it to the same mini-load station 8.

3) The mini-load station 8 fetches a first container 39 of the order to be delivered from an inventory carrier 3 and places it on the delivery carrier 9.

4) Upon completion of the transfer of containers, an MRU 10 moves the delivery carrier 9 to a delivery hatch station 24. Transfer of the containers 39 which are carried on the delivery carrier 9 to the delivery hatch drawers 12 may be achieved in the following manner:

4a) The MRU 10 moves the delivery carrier 9 at a delivery hatch (a pod could feature a number of delivery hatches depending on the delivery throughput capacity needed) 2910.

4b) In certain embodiments each drawer is able to sustain two containers. The MRU 10 eventually propels to the delivery hatch 24 and lowers the delivery carrier 9 with the order containers 39. By doing so the containers are locked onto the bottom of the corresponding drawers 12 as they were found precisely under the boxes prior to lowering the delivery carrier 9.

4c) During container transfer from the delivery carrier 9 onto the drawers 12 the latter are kept firmly in a closed position. This is achieved by a number of electromagnets 15 placed on the DH structure on the back of each drawer 12 which are activated and keep the drawers blocked at the closed position.

4d) Upon completion of the transfer the electromagnets 15 release the drawers. The drawers are pushed to open by springs 16 or other means properly fastened on the back of the drawers 12.

5) The customer fully opens the drawers and picks up his/her order items.

6) As soon as picking up of the items is concluded the customer pushes back the drawers 12 and taps on the button displaying "Pickup completion" at 2920. Then the electromagnets are activated and lock the drawers closed.

7) An MRU 10 removes the delivery carrier from the DH slot (not shown).

Figure 30:
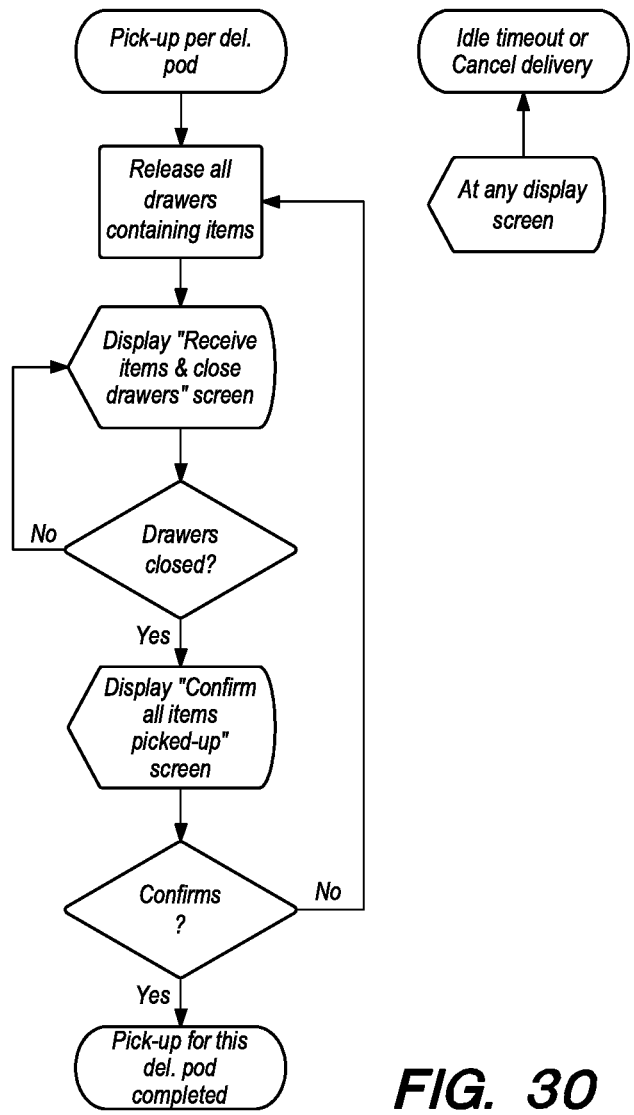
FIG. 30 depicts a flowchart describing the process of pick-up per delivery carrier, according to an exemplary embodiment.

Order pickup per delivery carrier (FIG. 30)—In case an order consists of more containers than what a delivery carrier 9 can carry then additional delivery cycles may be needed.

Figure 31:
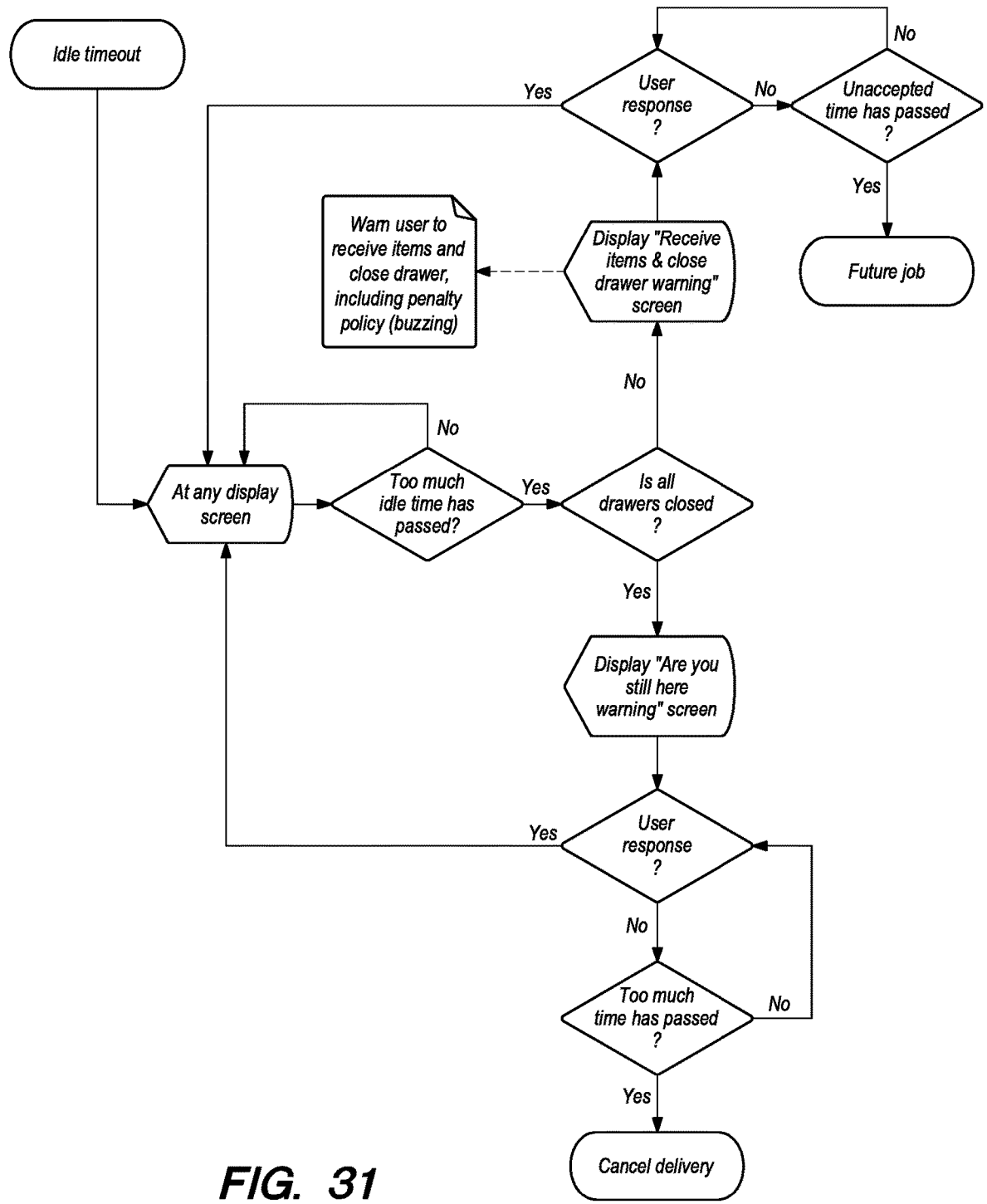
FIG. 31 depicts a flowchart describing the idle timeout process, according to an exemplary embodiment.

Idle timeout (FIG. 31)—The exemplary embodiment in which the system handles idle timeouts is displayed in "Idle timeout" flow chart depicted in FIG. 31.

Figure 32:
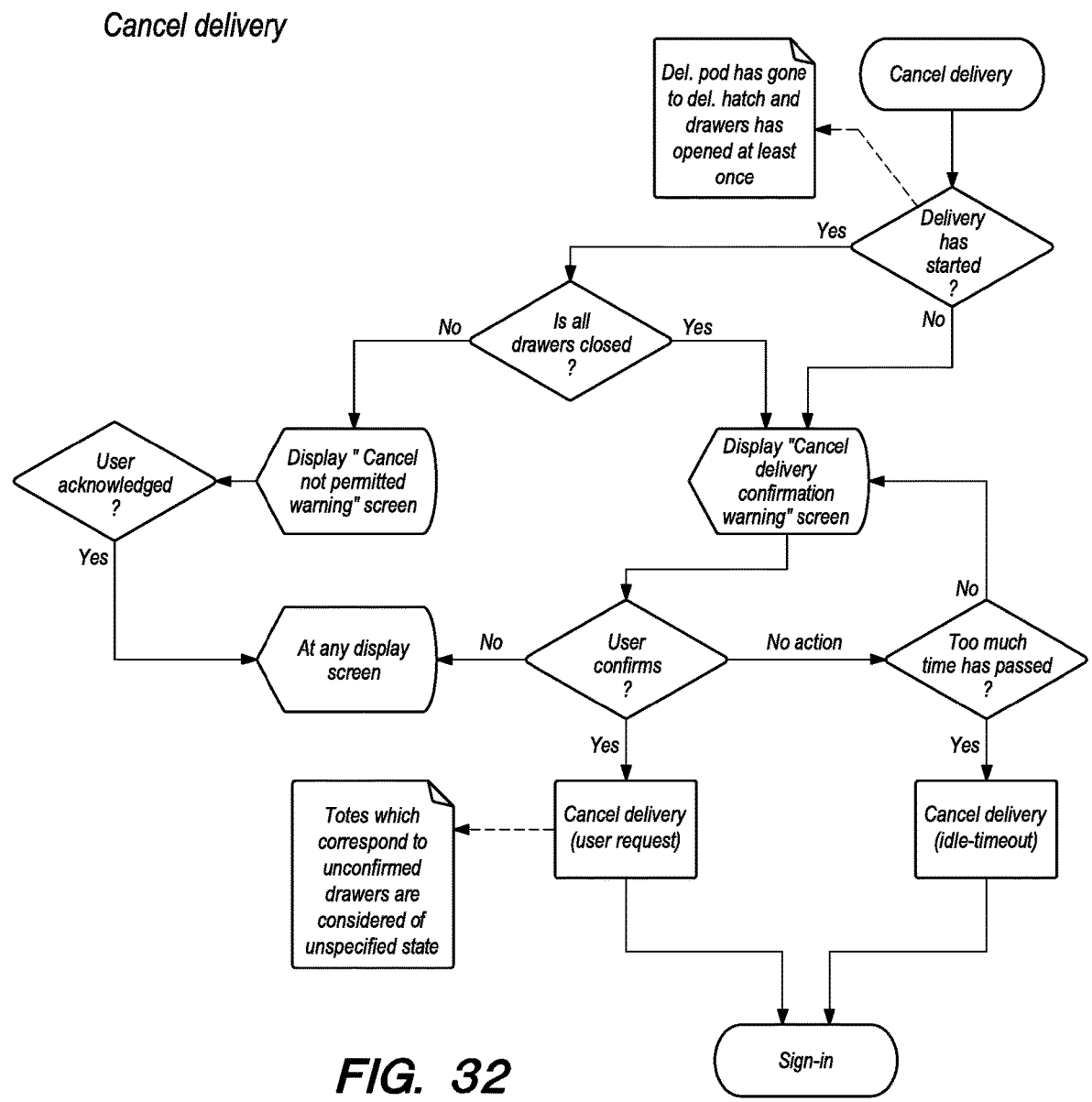
FIG. 32 depicts a flowchart describing the process of cancellation of delivery, according to an exemplary embodiment.

Cancel delivery (FIG. 32)—In any stage of the delivery process, the customer is able to abandon the order following the steps shown on "cancel delivery" flow chart depicted in FIG. 32.

Figure 33:
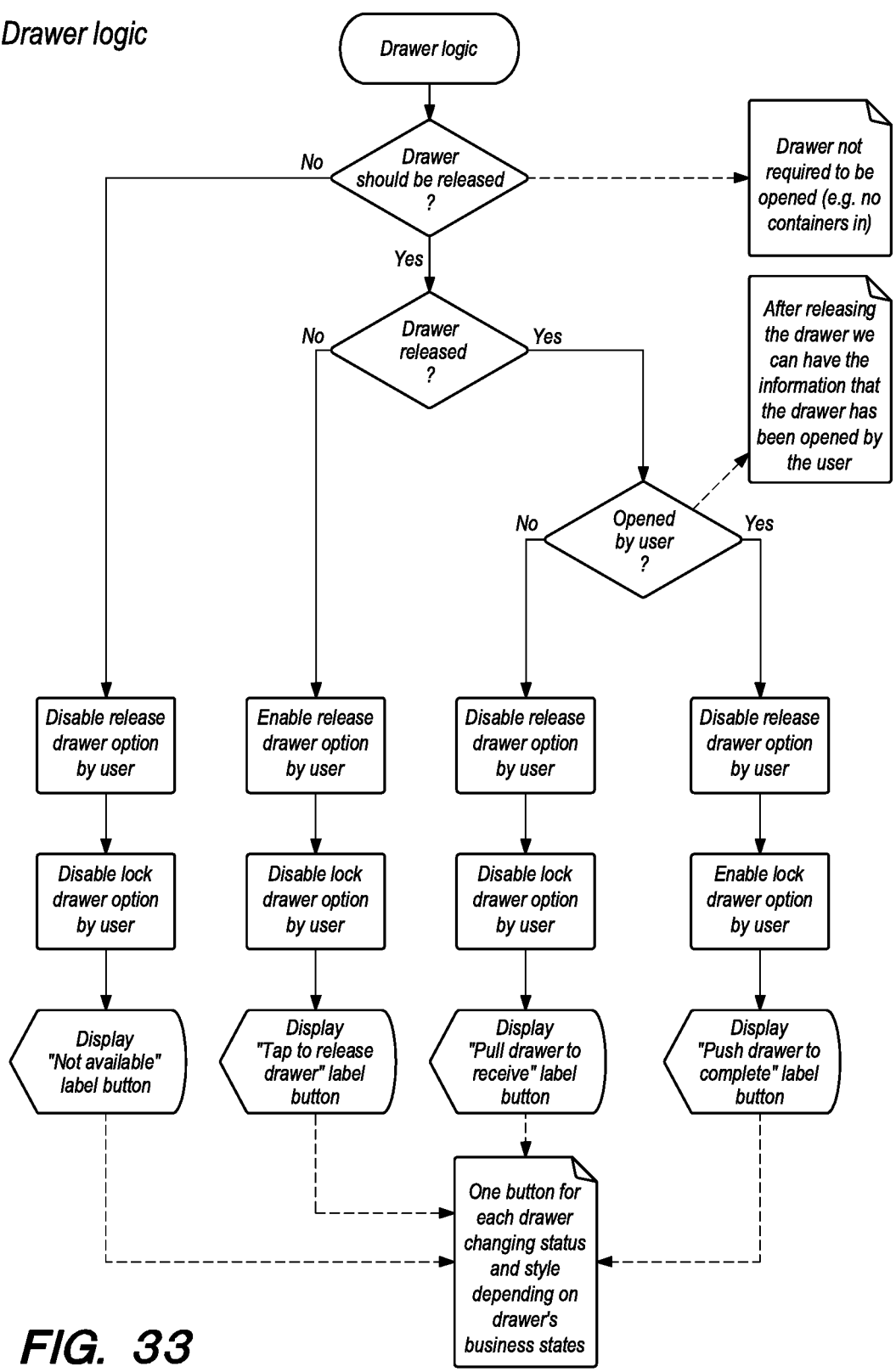
FIG. 33 depicts a flowchart describing the drawer logic, according to an exemplary embodiment.

Drawers' logic (FIG. 33)—The drawers' logic is displayed in "Drawers' logic" flow chart depicted in FIG. 33.

Figure 17:
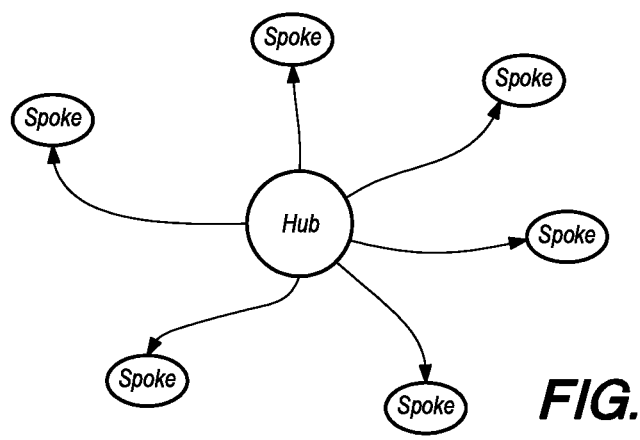
FIG. 17 illustrates a Hub and Spokes arrangement, according to an exemplary embodiment.

Loading a home delivery vehicle—Order cut-off time is recognized as a major factor for smooth online customer experience. The closer the cut-off time to the order delivery time slot the smoother the customer experience. This is better served when the online orders are fulfilled as soon as they are received and then sent to a Pod where the final distribution itineraries are managed. A number of pods 35 can be set up around an online order fulfillment center forming a hub and spoke distribution arrangement (FIG. 17). By doing so the function of itineraries shipment formation for the final home distribution is shifted from the Hub to the Spoke, i.e. the Pod. This makes the shipment process a lot simpler and faster and helps shift cut-off time closer to the delivery time slot.

Transportation on the other hand is a major cost factor for home delivery. Conventionally, the industry has used the "Hub and Spoke" systems (FIG. 17) to improve transportation costs. The problem with the state of the art methods in use is that such a distribution scheme rapidly increases shipment managerial problems because all these spokes need on site supervision and shipment management.

The described arrangement is a new business model offering fully unmanned online order sorting and shipment handling by using the following process:

1) Online orders are fulfilled and shipped to the corresponding pod 35 in waves on a FIFO (First In—First Out) basis. Inventory carriers 3 are used to ship the containers 39 with the online orders to the pod 35.

2) Inbound inventory carriers are stored in the pod 35.

3) Upon finalization of a specific home delivery itinerary a list of the containers 39 that need to be sorted out and put in separate inventory carriers 3 is generated.

4) A mini-load unit 8 supported by MRU(s) 10 follow a similar procedure with the one used to deliver an order (see Order Delivery above), loading the containers on a FILO (First In—Last Out) order on inventory carriers 3.

5) Upon arrival of a home delivery vehicle at the pod 35 the driver punches in the replenishment hatch panel control panel 38 the itinerary code number.

6) The system, following a similar procedure with the Outbound Process described above, presents one after the other the inventory carriers 3 carrying the orders to be shipped.

Figure 15:
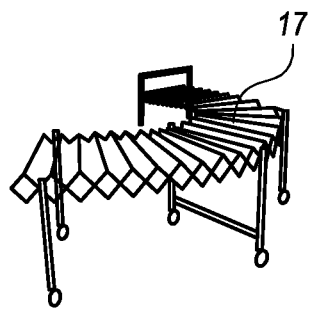
FIG. 15 illustrates a dynamic roller conveyor 17 for loading containers into a home delivery vehicle 18, according to an exemplary embodiment.
Figure 16:
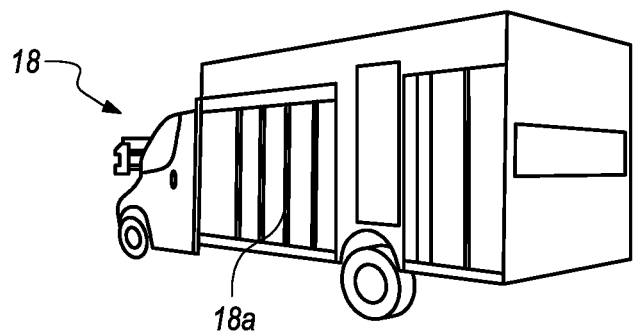
FIG. 16 illustrates a home delivery vehicle 18 equipped for containers loading, according to an exemplary embodiment.

7) In certain embodiments the inventory carriers 3 are loaded into the delivery vehicle. In another embodiment the delivery vehicle 18 is equipped with a special rack structure 18a (FIG. 16) to store the containers. The containers are stored in a FILO manner through the following steps:

7a) The driver pulls out of the replenishment hatch 23 a first inventory carrier 3 and unloads its containers on the dynamic roller conveyor 17 (FIG. 15). The unloading follows a specific pattern (for example unloading first the top shelf of the inventory carrier, then the next one etc.).

7b) When the first container on the dynamic roller conveyor 17 reaches the unloading front of the dynamic roller conveyor a scanner fixed on the conveyor (not shown) "reads" the container's barcode (not shown).

7c) A "Put to Light" system which is attached at the loading face of the vehicle and is used to guide the driver into which slot in rack 18a to put the container 39. This way the containers are loaded into the vehicle in a consistent LIFO manner which eventually greatly enhances faster drop off of orders at each and all itinerary's calls.

The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A method for order delivery at a pod having a plurality of containers, one or more inventory carriers each configured to support one or more containers, one or more delivery carriers each configured to support one or more containers, one or more carrier bases each configured to support an inventory carrier or a delivery carrier, one or more mobile robotic units (MRUs) each configured to propel an inventory carrier or a delivery carrier, and one or more mini load stations for manipulating containers, the method comprising:

fulfilling an order at a fulfillment center;
delivering the order from the fulfilment center to a replenishment station of the pod, said delivering including disposing a first portion of the order in a first container and supporting the first container on a first inventory carrier for transport from the fulfilment center to the replenishment station;
transporting the first inventory carrier supporting the first container containing the first portion from the replenishment station to a storage location in the pod;
authenticating, by a processor, a customer;
transporting, by the MRUs, the first inventory carrier supporting the first container containing the first portion from the storage location to a mini load station;
using the mini load station to transfer the first container containing the first portion from the first inventory carrier to a first delivery carrier; and
transporting, by the MRUs, the first delivery carrier supporting the first container containing the first portion from the mini load station to a delivery hatch for pick-up by the customer.

2. The method of claim 1, wherein the authentication is performed using at least one of near field communication (NFC) technology, voucher identification and Quick Response (QR) scanning.

3. The method of claim 1, wherein authentication is performed using customer identification information that is received at a control panel at the pod.

4. The method of claim 1, further comprising: transferring the first container from the first delivery carrier to at least one delivery drawer at the delivery hatch.

5. The method of claim 4, further comprising: locking the at least one delivery drawer, using at least one electromagnet, while the first container is being transferred from the first delivery carrier to the at least one delivery drawer, and opening the at least one delivery drawer, upon completion of the transfer of the first container from the first delivery carrier to the at least one delivery drawer.

6. The method of claim 4, wherein the order comprises multiple portions each associated with containers that are delivered to the at least one delivery drawer over multiple delivery cycles.

7. The method of claim 1, wherein the storage location in the pod is in one of multiple temperature zones, to which the first inventory carrier is transported based on temperature requirements of the first portion of the order.

8. The method of claim 1, wherein transporting includes disposing the first inventory carrier or first delivery carrier on a carrier base and propelling the first inventory carrier or first delivery carrier and the carrier based base using the MRU.

9. The method of claim 1, wherein the pod is one of multiple pods of a hub-and-spoke arrangement with the fulfillment center.

10. A pod for delivery of an order from a fulfilment center to a customer, comprising:
a plurality of containers;
one or more inventory carriers each configured to support one or more containers;
one or more delivery carriers each configured to support one or more containers;

one or more carrier bases each configured to support an inventory carrier or a delivery carrier;
one or more mobile robotic units (MRUs) each configured to propel an inventory carrier or a delivery carrier;
one or more mini load stations for manipulating containers;
a memory;
a replenishment station;
a delivery hatch;
at least one processor configured to execute machine executable code stored in the memory for performance of a procedure comprising:
receiving at the replenishment station at least a first portion of an order from a fulfilment center, said received at least first portion being disposed in a first container supported on a first inventory carrier transported from the fulfilment center to the replenishment station;
transporting the first inventory carrier supporting the first container containing the at least first portion from the replenishment station to a storage location in the pod;
authenticating a customer;
controlling the MRUs to transport the first inventory carrier supporting the first container containing the at least first portion from the storage location to a mini load station;
using the mini load station to transfer the first container containing the at least first portion from the first inventory carrier to a first delivery carrier; and
controlling the MRUs to transport the first delivery carrier supporting the first container containing the at least first portion from the mini load station to the delivery hatch for pick-up by the customer.

11. The pod of claim 10, wherein authenticating a customer comprises receiving at a control panel information relating to at least one of near field communication (NFC) technology, voucher identification and Quick Response (QR) scanning.

12. The pod of claim 11, wherein the pod is one of multiple pods of a hub-and-spoke arrangement with the fulfillment center.

13. The pod of claim 10, further comprising at least one delivery drawer to which the first container is delivered at the delivery hatch.

14. The pod of claim 13 further comprising: at least one electromagnet configured to lock the at least one delivery drawer while the first container is being transferred from the first delivery carrier to the at least one delivery drawer, and to open the at least one delivery drawer, upon completion of the transfer of the first container from the first delivery carrier to the at least one delivery drawer.

15. The pod of claim 13, wherein the order comprises multiple portions each associated with containers that are delivered to the at least one delivery drawer over multiple delivery cycles.

16. The pod of claim 10, wherein the storage location in the pod is in one of multiple temperature zones, to which the first inventory carrier is transported based on temperature requirements of the at least first portion of the order.

17. The pod of claim 10, wherein transporting includes disposing the first inventory carrier or first delivery carrier on a carrier base and propelling the inventory carrier or delivery carrier and the carrier based using the MRU.

* * * * *